US012737728B2

(12) United States Patent
Marshall et al.

(10) Patent No.: US 12,737,728 B2
(45) Date of Patent: Sep. 15, 2026

(54) GENERATING COLLABORATIVE DOCUMENTS FOR VIRTUAL MEETINGS IN A COMMUNICATION PLATFORM

(71) Applicant: Salesforce, Inc., San Francisco, CA (US)

(72) Inventors: Kevin Marshall, San Francisco, CA (US); Michael Hahn, San Francisco, CA (US); Noah Weiss, Austin, TX (US); Anna Niess, Hastings-on-Hudson, NY (US); Julie Haynes, Oakland, CA (US); Pedro Carmo, Brooklyn, NY (US); Katherine Jane Steigman, San Leandro, CA (US); Olivia Diane Grace, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 273 days.

(21) Appl. No.: 17/831,748

(22) Filed: Jun. 3, 2022

(65) Prior Publication Data

US 2023/0394440 A1 Dec. 7, 2023

(51) Int. Cl.
*G06Q 10/1093* (2023.01)
*G06F 16/93* (2019.01)

(52) U.S. Cl.
CPC ......... *G06Q 10/1093* (2013.01); *G06F 16/93* (2019.01)

(58) Field of Classification Search
CPC ........................... G06Q 10/1095; G06F 16/93
See application file for complete search history.

(56) References Cited

U.S. PATENT DOCUMENTS

2013/0019320 A1* 1/2013 Ericsson ................. G06F 21/10 726/28
2014/0222482 A1* 8/2014 Gautam ............. G06Q 10/1095 705/7.19

(Continued)

FOREIGN PATENT DOCUMENTS

WO WO-2007134305 A2 * 11/2007 ............. G06F 21/84
WO WO-2022153122 A1 * 7/2022 ........... G06F 3/0484

OTHER PUBLICATIONS

Gharani, Leila. "How to Use Microsoft Teams Effectively | Your Complete Guide." YouTube, YouTube, Jan. 12, 2021, www.youtube.com/watch?v=z6IUiamE3-U (Year: 2021).*

(Continued)

*Primary Examiner* — Jeremy L Gunn
(74) *Attorney, Agent, or Firm* — Lee & Hayes, P.C.

(57) ABSTRACT

Techniques for providing a collaborative document in association with a virtual meeting on a communication platform are discussed herein. Users may communicate within the communication platform via text-based messages, which may include links, documents, videos, etc. Users may request a virtual meeting with audio and/or video capabilities. Responsive to a request, users within the communication channel may be invited to the virtual meeting and the collaborative document. The collaborative document can enable messaging and sharing functionalities attributable to a virtual space. The collaborative document may be populated with communications previously exchanged within the communication channel, such that links, documents, videos, content, etc. that occurred or were shared within the communication channel may be indicated within the collaborative document to provide context to the virtual meeting. Users may engage, within the collaborative document, in (Continued)

audio and/or video communications, as well as share links, documents, screens (i.e., screen-sharing), and the like.

20 Claims, 13 Drawing Sheets

(56) References Cited

U.S. PATENT DOCUMENTS

| | | | | |
|---|---|---|---|---|
| 2016/0366082 | A1* | 12/2016 | Ross | H04L 67/10 |
| 2017/0374425 | A1* | 12/2017 | Disley | G06Q 10/103 |
| 2018/0095940 | A1* | 4/2018 | Meixner | H04L 51/046 |
| 2018/0287982 | A1 | 10/2018 | Draeger et al. | |
| 2019/0007467 | A1* | 1/2019 | Powell | H04M 3/567 |
| 2020/0293261 | A1* | 9/2020 | Janamanchi | H04L 12/1831 |
| 2023/0214780 | A1* | 7/2023 | Fong | G06F 16/176 705/7.18 |
| 2023/0244857 | A1* | 8/2023 | Weiss | G10L 15/26 715/230 |
| 2023/0367617 | A1* | 11/2023 | Maurer | G06F 9/451 |

OTHER PUBLICATIONS

Text transcript of Gharani, Leila. "How to Use Microsoft Teams Effectively | Your Complete Guide." YouTube, YouTube, Jan. 12, 2021, www.youtube.com/watch?v=z6IUiamE3-U (Year: 2021).*
How to Use Microsoft Teams Effectively | Your Complete Guide. YouTube, YouTube, Jan. 12, 2021, www.youtube.com/watch?v=z6IUiamE3-U. (previously provided transcript) (Year: 2021).*
PCT Search Report and Written Opinion mailed Aug. 28, 2023 for PCT application No. PCT/US23/22562, 9 pages.
Gharani, "How to Use Microsoft Teams Effectively: Your Complete Guide", Jan. 12, 2021 (Jan. 12, 2021), XP093074845, Retrieved from the Internet: URL:https://www.youtube.com/watch?v=z6IUiamE3-U&Ic=Ugzmud081qXAaJLolWI4AaABAg; 2 pgs.
David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.
Michael Carney, "Slack is thriving on a cocktail of whimsy and great timing", Pandodaily, Lexisnexis, https:// advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims To Cut US All Some Slack", Readwriteweb, Lexisnexis, https:// advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000) pp. 154-161.
Dikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", Tedium, [online][retrieved May 9, 2019]. Retrieved from the Internet: <URL: https://tedium.co/2017/10/17/irc-vs-slack-chat-history/> (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

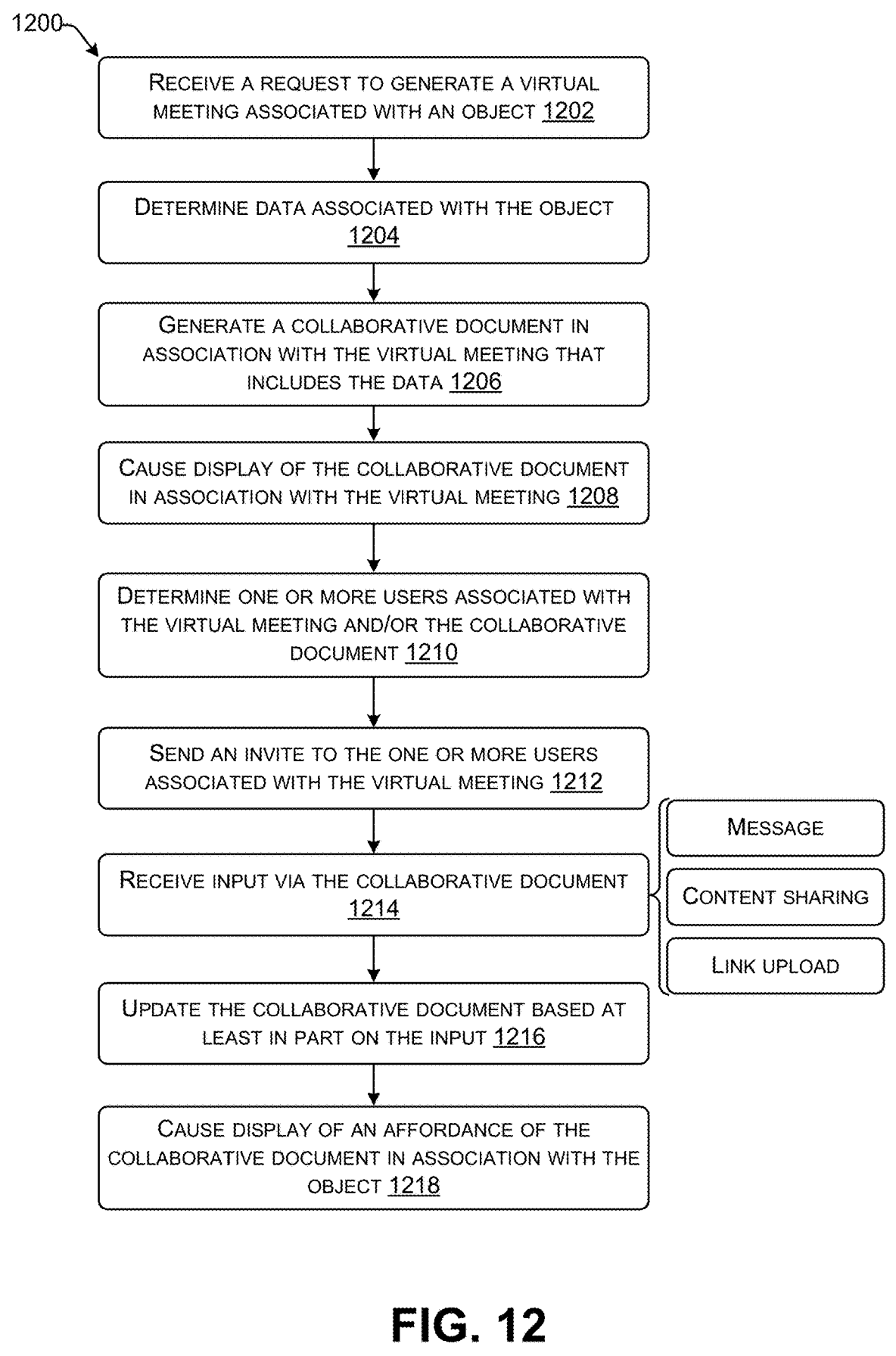

1200

RECEIVE A REQUEST TO GENERATE A VIRTUAL MEETING ASSOCIATED WITH AN OBJECT 1202

DETERMINE DATA ASSOCIATED WITH THE OBJECT 1204

GENERATE A COLLABORATIVE DOCUMENT IN ASSOCIATION WITH THE VIRTUAL MEETING THAT INCLUDES THE DATA 1206

CAUSE DISPLAY OF THE COLLABORATIVE DOCUMENT IN ASSOCIATION WITH THE VIRTUAL MEETING 1208

DETERMINE ONE OR MORE USERS ASSOCIATED WITH THE VIRTUAL MEETING AND/OR THE COLLABORATIVE DOCUMENT 1210

SEND AN INVITE TO THE ONE OR MORE USERS ASSOCIATED WITH THE VIRTUAL MEETING 1212

RECEIVE INPUT VIA THE COLLABORATIVE DOCUMENT 1214

MESSAGE

CONTENT SHARING

LINK UPLOAD

UPDATE THE COLLABORATIVE DOCUMENT BASED AT LEAST IN PART ON THE INPUT 1216

CAUSE DISPLAY OF AN AFFORDANCE OF THE COLLABORATIVE DOCUMENT IN ASSOCIATION WITH THE OBJECT 1218

FIG. 12

GENERATING COLLABORATIVE DOCUMENTS FOR VIRTUAL MEETINGS IN A COMMUNICATION PLATFORM

TECHNICAL FIELD

Communication platforms are becoming increasingly more popular for facilitating work-related communications, such as for project collaboration within a single organization and across two or more organizations. For instance, a meeting may be scheduled to discuss a particular project or portion thereof. The meeting can include means for transmitting written communications (e.g., communication channel, direct message instance, etc.) and/or oral communications (e.g., audio call, video call, etc.). Oftentimes, during a meeting, users often share information, or more generally, content, via documents, links, screen-sharing, and so forth. However, existing techniques for sharing information are often disorganized, have limited functionality, and may lead to a loss of information. Additionally, existing techniques are often generalized and require users to individually upload content. These limitations may require users to adopt different means by which they chat, manage tasks, and otherwise collaborate. As such, additional functionalities that may be helpful in collaboration amongst users.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 12 illustrates an example process for generating a collaborative document in association with a virtual meeting, as described herein.

DETAILED DESCRIPTION

Figure 1:
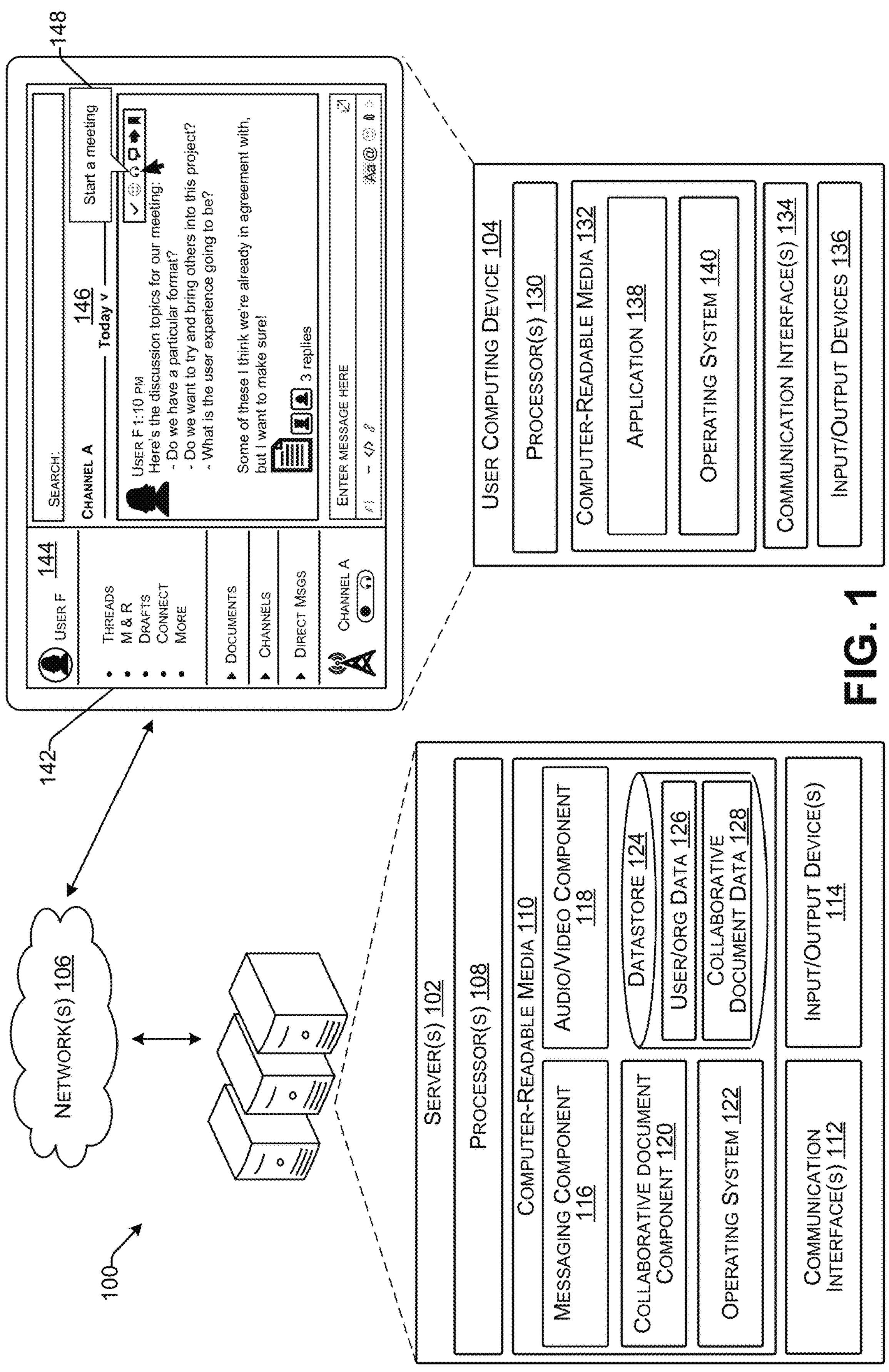
FIG. 1 illustrates an example system for performing techniques described herein.

This application is directed, at least in part, to providing a collaborative document in association with a virtual meeting scheduled on a communication platform. The communication platform, which, in some examples, can be a group-based communication platform, a channel-based communication platform, a permission-based communication platform, a channel-based messaging platform, and/or any other platform for facilitating communication between and among users, may enable users to exchange messages and/or other data via the communication platform. Initially, within the communication platform, users may communicate with one another via a communication channel by exchanging text-based messages. In some examples, these text-based messages may include links, documents (e.g., images, files, PDFs), videos, and so forth. However, from time to time, users may desire a more immersive experience and/or different forms of communication.

For example, rather than sending and receiving text-based messages, the users may schedule a virtual meeting with audio and/or video capabilities. Responsive to this request, users within the communication channel may be invited to the virtual meeting and the collaborative document for collaborating with one another. In some examples, the collaborative document enables messaging and sharing functionalities attributable to a virtual space. For example, the collaborative document may be populated with, or otherwise indicate, communications previously exchanged within the communication channel. For example, the links, documents, videos, content, and so forth that occurred or were shared within the communication channel may be indicated within the collaborative document as a way to provide context to the virtual meeting. In doing so, within the collaborative document, the users may engage in audio and/or video communications, as well as share links, documents, screens (i.e., screen-sharing), and the like. This increased form of communication may enhance user experiences and lead to effective and efficient coworking.

Generally, the collaborative document can be associated with a document identifier (e.g., virtual space identifier, communication channel identifier, etc.) configured to enable messaging and sharing functionalities attributable to a virtual space (e.g., a communication channel) within the collaborative document. That is, the collaborative document can be treated as, and include the functionalities associated with, a virtual space, such as a communication channel. As such, within the collaborative document, the users may communicate, exchange messages, share content, and so forth. In some examples, and as explained herein, the collaborative document may be created in association with a virtual meeting in which users communicate via audio and/or video. The collaborative document may be launched for real-time conversation that allows users to share and/or create files and screens that come alive with cursor tracking, drawing, and a sense of presence.

In some examples, users may request the virtual meeting with audio and/or video. In some examples, users may request the virtual meeting within the communication channel. For example, a first user may interact within the communication channel via a first user interface. The first user may request the virtual meeting as well as one or more additional users that are to be invited to collaborate within the virtual meeting. In some examples, the communication platform can identify a second user account that is associated with the virtual meeting (e.g., a second user associated with the second user account is a member of the virtual space). In examples in which the request is submitted via the communication channel, the communication platform can identify one or more members of the communication channel as user(s) to be associated with the virtual meeting. That is, user identifier(s) that are associated with the communication channel may additionally be associated with the virtual meeting such that any of the members of the communication channel are added to the virtual meeting.

Additionally, in some examples, the virtual meeting may be created independent of the communication channel, and the communication platform may identify the requesting user (e.g., the first user) as a user to be associated with the virtual meeting. That is, the first user can submit the request to create the virtual meeting independent of the communication channel (e.g., in association with a user account of the first user). In some examples, an identifier can be stored as metadata and can include a unique code (e.g., numbers, letters, symbols, and/or a combination thereof) that can be used to identify the virtual meeting. In other examples, user identifier(s) that are associated with a particular communication (e.g., message) within the communication channel may be associated with the virtual meeting such that the users that have responded to the particular communication, reacted to the particular communication (e.g., liked, disliked, emoji, etc.), and so forth are associated with the virtual meeting.

Still, in some examples, the virtual meeting may be requested from a sidebar of a user interface and/or from a dashboard of the communication platform. The sidebar, in some examples, may include a portion of the user interface that includes lists of communication channels that are associated with a particular user account. For example, the sidebar can include a list of workspaces, communication channels, direct messaging instances, and/or the like that are associated with the user account. For the sidebar, the user may request the virtual meeting and invite one or more other users to the virtual meeting.

In some examples, the virtual meetings may be asynchronous meetings generated ad hoc such that the first user can generate an asynchronous meeting and a message associated with the asynchronous meeting can be posted to the communication channel as soon as the asynchronous meeting is generated. Such asynchronous meetings can be "one-off" meetings or an initial meeting of a set of recurring meetings. In some examples, asynchronous meetings can be scheduled such that the first user can generate an asynchronous meeting.

In some examples, and as indicated above, the virtual meeting may be requested from, or in association with, messages posted within the communication channel. These messages may include, but are not limited to, text (e.g., which can be editable), a file (e.g., text, audio, video, an application, etc.), a task to be completed, a ticket to be resolved, an event (e.g., scheduled event, calendar invitation, calendar instance, etc.), a message previously transmitted via the communication platform, an image, a graphic, a link to a local object, a link to a remote object (e.g., third-party object), and/or the like. In some examples, the communication platform can identify the object(s) based on user input from the creating user (e.g., the first user). For example, the first user may request the virtual meeting to be created in association with a particular document shared within the communication channel. Here, based on the user input, the communication platform can cause the virtual meeting to be created around the document. This may, in some examples, allow the users to collaborate around the document.

Regardless of the specific implementation, in response to receiving the request, the communication platform can identify one or more users, such as the first user and the second user, to be associated with the virtual meeting. As part of creating the virtual meeting, the communication platform may generate the collaborative document. The collaborative document may be attached, or otherwise associated, with the virtual meeting. As an example, as part of the request, the communication platform can identify one or more objects to be associated with the virtual meeting and the collaborative document.

As part of generating the collaborative document, the communication platform can cause an affordance associated with the virtual meeting and/or the collaborative document to be presented via a user interface associated with each member of the virtual meeting. In some examples, the communication platform can modify user interface(s) corresponding to the one or more users associated with the virtual meeting to include the affordance. For example, based on an identification of the second user account, the communication platform can cause a notification associated with the request to be presented on a second user interface associated with the second user, such as in association with an affordance (e.g., an identifier, an indicator, a selectable control, a user interface element, a graphical element, an icon, text, an image, etc.) corresponding to the virtual meeting. In various examples, the affordance may include a selectable icon that, when selected by a respective user, causes the virtual meeting and the collaborative document to be presented via a user interface associated with the user. For example, the second user can select the affordance and/or the notification to access the collaborative document and join the virtual meeting. Here, the second user (as well as the first user) may indicate whether their audio and/or video is enabled.

Additionally or alternatively, the affordance of the virtual meeting may be presented in the sidebar of the user interfaces, respectively. Still, in some examples, the affordance associated with the virtual meeting may be presented in association with the communication channel via which the virtual meeting was created (e.g., as a message within the communication channel).

In at least one example, the affordances displayed to the invited users may indicate a discussion topic that is to take place in the virtual meeting. For example, if the first user submitted the request for the virtual meeting around an object (e.g., document), the affordance displayed to the second user may indicate that the first user wants to discuss the object. Additionally, the communication platform may utilize the object as a way to import communications into the collaborative document. For example, if the collaborative document is created in association with the object, the communication platform may populate the collaborative document with the communications concerning the object. This may be accomplished via using identifiers and threads within the communication channel.

In some examples, in response to receiving an indication of selection of the affordance associated with the virtual meeting, the communication platform can cause display of the collaborative document on respective user interfaces of the user. In some examples, the collaborative document includes communications, affordances of documents, links, and so forth that were exchanged within the communication channel, and so forth. For example, continuing with the above example, if the virtual meeting was created in association with the object, the object itself may be displayed as an affordance within the collaborative document. Additional documents, files, links, and so forth that were presented or posted within the communication channel may be populated within the collaborative document as well. As noted above, in some examples, the requesting user (e.g., the first user) may determine those documents, files, links, and so forth that are populated within the collaborative document based on which object the collaborative document is created around.

Within the collaborative document, the users may enable audio and/or video communications via their respective user interfaces. For example, the first user and/or the second user may enable audio and/or video communications via their respective user interfaces. In some examples, the first user and/or the second user may interact with one or more affordances to enable audio and/or video. Responsive to input, the user interfaces may respectively display video of the first user and the second user, and/or may output audio of the first user and/or the second user. For example, the second user (as well as other users) may indicate whether they wish to have their audio and/or video enabled.

As introduced above, the collaborative document may support messaging functionalities (e.g., chat channel), message timing documentation (e.g., time stamps), file uploads, notifications (e.g., new messages posted, mentions or tags, etc.), mentioning or tagging functionalities, event conveyance, workflow management and tracking, access permissions, and/or other functionalities within the virtual meeting. In other words, the communication platform can treat the collaborative document as a communication channel such that functionalities of the communication channel may be imbued in the collaborative document. Additionally, the collaborative document may include capabilities for the users to share their screens, present documents, links, files, and so forth. The collaborative document may further include a message thread that allows the users to communicate with one another, within the collaborative document, and separate from the communication channel. For example, the users may post messages, links, documents, and so forth within the message thread of the collaborative document. These messages may be tracked and recorded and populated within the communication channel, in association with the virtual meeting, following a termination or a closing of the collaborative document. The message thread can be a message associated with another message that is not posted to the communication channel, direct message, or other virtual space, but instead is maintained within an object associated with the original message. As such the message or communications that occur during a virtual meeting may be tracked and recorded within the collaborative document for accessing at later instances.

The collaborative document may include affordances of those users that are within or have been invited to the collaborative document. For example, a first affordance of the first user may be presented and/or a second affordance of the second user may be presented in association with the collaborative document. Of course, the collaborative document may include more than two users, and in such examples, more than two affordances of the users may be presented, respectively. Generally, these affordances may provide an indication of the users that are within the collaborative document. Additionally, even after generation of the collaborative document, other users may be invited.

In some examples, the collaborative document, or user interfaces of the users within the collaborative document, may indicate the respective content being viewed by the users. For example, affordances may be displayed that indicate which content the users are respectively observing and/or which content the users have respectively viewed. This may indicate, to others within the collaborative document, the interactions and/or engagement of the users. Additionally, or alternatively, the collaborative document may indicate a location of respective cursors of the users. For example, if the first user is presenting content, the collaborative document may indicate, in association with the content being presented by the first user, a cursor location associated with the second user. This may, in some examples, allow the first user to understand the portion of the content currently being viewed by the second user. However, the second user may be engaging with other content (e.g., document, application, etc.) separate from content being presented or discussed by the first user. In such examples, the collaborative document may present an affordance of the content currently being presented by the first user, as well as an affordance of the content currently being viewed by the second users (e.g., based on a location of a cursor of the second user). Of course, the users may initially opt-in or authorize the sharing of their screen and/or cursor tracking.

In some examples, the collaborative document may be associated with permissions defining which users of the communication platform may share content within the collaborative document, post messages to the collaborative document, and so forth. In various examples, the permissions may be defined or otherwise specified based on parameters by which the collaborative document was created. Additionally, the permissions may include which users are able to invite other users to the collaborative document, and/or which users are unable to invite users to the collaborative document. For example, the user associated with a creation of the collaborative document may include permissions to invite additional users, while a user who received an invitation to join the virtual space may not include permissions to invite additional users. However, in some examples, all members of the collaborative document and/or the object in which the collaborative document is created around may be able to invite additional users, upload documents, and so forth.

Following a conclusion of the collaborative document, the communications that transpired within the collaborative document may be populated back within the communication channel. For example, the messages posted to the message thread may be displayed within the communication channel. Additionally, an affordance of the collaborative document may be presented within the communication channel. For example, within the communication channel, an affordance may be presented that indicates the occurrence of the collaborative document. In some examples, the communication channel may indicate a time at which the collaborative document was created, the users of the collaborative document, and so forth. In some examples, the affordance is presented as a most-recent message within the communication channel to indicate, within the communication channel, that the collaborative document was created and that the virtual meeting took place. Additionally, by posting the messages within the message thread to the communication channel, a history of the messages may be recorded and later accessed by the users. However, in some examples, the communication channel may be updated in real-time or near-real time, such that the information communicated within the virtual space is populated within the communication channel. This may, in some examples, negate potential confusion as to the current communications within the communication channel.

The collaborative document is stored and archived for later use and/or reference after the virtual meeting has terminated. For example, when the virtual meeting is over, the collaborative document still persists so that the users do not lose the discussion, files, or links shared in the virtual meeting. Additionally, at a later instance in time, another virtual meeting around the same object may take place and, in such instances, the collaborative document is accessed. Additional communications that take place are tracked and recorded, and updates are made to the collaborative document.

Although the virtual meeting and the collaborative document are described as being performed by, or carried out on, the communication platform, the techniques described herein may occur within third-party applications. For example, the collaborative document may be generated in association with virtual meetings schedule on third-party applications, separate from the communication platform. In such instances, the collaborative document may be embedded into the virtual meeting such that users participating in the virtual meeting can message and/or exchange data via the collaborative document and within a third-party video conferencing application, for example.

Additionally, the techniques herein are described in conjunction with generating a collaborative document in association with a virtual meeting, however, the collaborative document may previously exist and prior to the virtual meeting. In this matter, the collaborative document may exist before or after a real-time conversation (e.g., a virtual meeting). In some examples, the virtual meetings may be scheduled around the same collaborative document and different times. For example, after collaborating within the virtual meeting at a first instance in time, at a second instance in time, another virtual meeting may take place. In this instance, the collaborative document may be associated with each of the virtual meetings, for example, if the users want to virtually meet and discuss the collaborative document.

The techniques described herein greatly enhance the utility and functionality within the communication platform. As discussed above, conventional techniques fail to populate a collaborative document with files, documents, links, and so forth that previously transpired within the communication channel. In such examples, users of the collaborative document are left with little context and/or history about the previous communications within the communication channel. This may, in some examples, lessen an amount of instances or applications operating when collaborating on a project. For example, given that the collaborative document is populated with communications within the communication channel, users may not have to toggle between panes, user interfaces, and so forth to access previous communications and/or content shared. In other words, when the user switches back and forth, the user loses a context associated with the collaborative document. As such, existing techniques result in fragmented conversations and provide poor user experiences.

Further, when the user switches back and forth, the user is required to toggle between multiple display windows (e.g., the third-party application and application and/or web browser providing communication platform functionality) or interact with multiple display windows. Here, existing techniques consume computing resources by presenting multiple windows on a computing device of a user. Further, existing techniques provide a less than optimal user experience as users are required to switch back and forth between computing resources. Additionally, the sharing capabilities within the collaborative document may enhance user experiences, and provide a way that enables users to understand what other users are currently viewing. In some examples, due to the enhanced functionalities provided by the collaborative document, the techniques described herein can reduce a number of applications running on a user computing device to monitor and/or manage a project. As such, the techniques described herein may reduce an amount of computing resources utilized in the collaboration.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example environment 100 for performing techniques described herein. In at least one example, the environment 100 can be associated with a communication platform that can leverage a network-based computing system to enable users of the communication platform to exchange data. In at least one example, the communication platform can be "group-based" such that the platform, and associated systems, communication channels, messages, collaborative documents, canvases, audio/video conversations, and/or other virtual spaces, have security (that can be defined by permissions) to limit access to a defined group of users. In some examples, such groups of users can be defined by group identifiers, which can be associated with common access credentials, domains, or the like. In some examples, the communication platform can be a hub, offering a secure and private virtual space to enable users to chat, meet, call, collaborate, transfer files or other data, or otherwise communicate between or among each other. In some examples, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the environment 100 can include one or more server computing devices (or "server(s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, such as portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (TOT) device, or any other computing device capable of sending communications and performing the functions according to the techniques described herein. While a single user computing device 104 is shown, in practice, the environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, and/or the like.

The network(s) 106 can include, but are not limited to, any type of network known in the art, such as a local area network (LAN) or a wide area network (WAN), the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over the network(s) 106 are well known and are not discussed herein in detail.

In at least one example, the server(s) 102 can include one or more processor(s) 108, computer-readable media 110, one or more communication interface(s) 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. The computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a messaging component 116, an audio/video component 118, a collaborative document component 120, an operating system 122, and a datastore 124.

In at least one example, the messaging component 116 can process messages between users. That is, in at least one example, the messaging component 116 can receive an outgoing message from a user computing device 104 and can send the message as an incoming message to a second user computing device 104. The messages can include direct messages sent from an originating user to one or more specified users and/or communication channel messages sent via a communication channel from the originating user to the one or more users associated with the communication channel. Additionally, the messages can be transmitted in association with a collaborative document, canvas, or other collaborative space, such as a virtual meeting as discussed herein. In at least one example, the virtual meeting can include a flexible canvas for curating, organizing, and sharing collections of information between users. In at least one example, the collaborative document can be associated with a document identifier (e.g., virtual space identifier, communication channel identifier, etc.) configured to enable messaging functionalities attributable to a virtual space (e.g., a communication channel) within the collaborative document. That is, the collaborative document can be treated as, and include the functionalities associated with, a virtual space, such as a communication channel. The virtual space, or communication channel, can be a data route used for exchanging data between and among systems and devices associated with the communication platform.

In at least one example, the messaging component 116 can establish a communication route between and among various user computing devices, allowing the user computing devices to communicate and share data between and among each other. In at least one example, the messaging component 116 can manage such communications and/or sharing of data. In some examples, data associated with a virtual space, such as a collaborative document, can be presented via a user interface. In addition, metadata associated with each message transmitted via the virtual space, such as a time stamp associated with the message, a sending user identifier, a recipient user identifier, a conversation identifier and/or a root object identifier (e.g., conversation associated with a thread and/or a root object), and/or the like, can be stored in association with the virtual space.

In various examples, the messaging component 116 can receive a message transmitted in association with a virtual space (e.g., direct message instance, communication channel, canvas, collaborative document, etc.). In various examples, the messaging component 116 can identify one or more users associated with the virtual space and can cause a rendering of the message in association with instances of the virtual space on respective user computing devices 104.

In various examples, the messaging component 116 can identify the message as an update to the collaborative document and, based on the identified update, can cause a notification associated with the update to be presented in association with a sidebar of user interface associated with one or more of the user(s) associated with the collaborative document. For example, the messaging component 116 can receive, from a first user account, a message transmitted in association with a collaborative document. In response to receiving the message (e.g., interaction data associated with an interaction of a first user with the virtual space), the messaging component 116 can identify a second user associated with the collaborative document (e.g., another user that is a member of the virtual space). In some examples, the messaging component 116 can cause a notification of an update to the collaborative document to be presented via a sidebar of a user interface associated with a second user account of the second user. In some examples, the messaging component 116 can cause the notification to be presented in response to a determination that the sidebar of the user interface associated with the second user account includes an affordance associated with the collaborative document. In such examples, the notification can be presented in association with the affordance associated with the collaborative document.

In various examples, the messaging component 116 can be configured to identify a mention or tag associated with the message transmitted in association with the collaborative document. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier, such as in association with an affordance associated with the collaborative document in a sidebar of a user interface associated with the particular user and/or in a collaborative document associated with mentions and reactions. That is, the messaging component 116 can be configured to alert a particular user that they were mentioned in a collaborative document.

In at least one example, the audio/video component 118 can be configured to manage audio and/or video communications between and among users during a virtual meeting. In some examples, the audio and/or video communications can be associated with a virtual meeting. In at least one example, the virtual meeting can include a discrete identifier configured to uniquely identify the virtual meeting. In some examples, the audio/video component 118 can store user identifiers associated with user accounts of members of a particular virtual meeting, such as to identify user(s) with appropriate permissions to access the particular virtual meeting.

In some examples, communications associated with a virtual meeting can be synchronous and/or asynchronous. That is, the virtual meeting can include a real-time audio and/or video conversation between a first user and a second user during a period of time and, after the first period of time, a third user who is associated with (e.g., is a member of) the conversation can contribute to the virtual meeting. The audio/video component 118 can be configured to store audio and/or video data associated with the virtual meeting, such as to enable users with appropriate permissions to listen and/or view the audio and/or video data.

In some examples, the audio/video component 118 can be configured to generate a transcript of the virtual meeting, and can store the transcript in association with the audio and/or video data. The transcript can include a textual representation of the audio and/or video data. In at least one example, the audio/video component 118 can use known speech recognition techniques to generate the transcript. In some examples, the audio/video component 118 can generate the transcript concurrently or substantially concurrently with the virtual meeting. That is, in some examples, the audio/video component 118 can be configured to generate a textual representation of the conversation while it is being conducted. In some examples, the audio/video component 118 can generate the transcript after receiving an indication that the virtual meeting is complete. The indication that the virtual meeting is complete can include an indication that a host or administrator associated therewith has stopped the virtual meeting, that a threshold number of meeting attendees have closed associated interfaces, and/or the like. That is, the audio/video component 118 can identify a completion of the virtual meeting and, based on the completion, can generate the transcript associated therewith.

In at least one example, the audio/video component 118 can be configured to cause presentation of the transcript in association with a collaborative document with which the virtual meeting is associated. For example, a first user can initiate a virtual meeting in association with a communication channel. The audio/video component 118 can process audio and/or video data between attendees of the virtual meeting, and can generate a transcript of the audio and/or video data. In response to generating the transcript, the audio/video component 118 can cause the transcript to be published or otherwise presented via the communication channel. In at least one example, the audio/video component 118 can render one or more sections of the transcript selectable for commenting, such as to enable members of the communication channel to comment on, or further contribute to, the virtual meeting. In some examples, the audio/video component 118 can update the transcript based on the comments.

In at least one example, the audio/video component 118 can manage one or more virtual meetings in association with a collaborative document associated with a group (e.g., organization, team, etc.) administrative or command center. The group administrative or command center can be referred to herein as a virtual (and/or digital) headquarters associated with the group. In at least one example, the audio/video component 118 can be configured to coordinate with the messaging component 116 and/or other components of the server(s) 102, to transmit communications in association with other collaborative documents that are associated with the virtual headquarters. That is, the messaging component 116 can transmit data (e.g., messages, images, drawings, files, etc.) associated with one or more communication channels, direct messaging instances, collaborative documents, canvases, and/or the like, that are associated with the virtual headquarters. In some examples, the communication channel(s), direct messaging instance(s), collaborative document(s), canvas(es), and/or the like can have associated therewith one or more virtual meetings managed by the audio/video component 118. That is, the virtual meeting associated with the virtual headquarters can be further associated with, or independent of, one or more other collaborative documents of the virtual headquarters.

In at least one example, the collaborative document component 120 can manage collaborative documents associated with audio/video communications. For example, in at least one example, users of the communication platform may request audio/video communications as part of a virtual meeting, noted above. In some examples, the virtual meeting may be associated with a communication channel, objects that are shared within the communication channel, or may be generated outside of a specific communication channel. Responsive to receiving a request for the virtual meeting, the collaborative document component 120 may generate a collaborative document. The collaborative document, indicated above, may include a flexible canvas for curating, organizing, and sharing collections of information between users. In at least one example, the collaborative document is configured to enable messaging functionalities attributable to a virtual space and can include the functionalities associated with a virtual space. The collaborative document is attached to, or created in association with, the virtual meeting to enable a sharing of information between users of the virtual meeting.

In some examples, the collaborative document component 120 can manage the collaborative document created in association with virtual meetings having audio/video communications. That is, the collaborative document component 120 can receive requests to associate users with the virtual meetings, and the collaborative document component 120 can associate user accounts associated with such users with group identifiers associated with the collaborative documents. For example, responsive to receiving a request to create a virtual meeting with audio/video communications, the collaborative document component 120 can associate a user account of the user with a group identifier of the collaborative document. The collaborative document component 120 can also disassociate user accounts and group identifiers, for example, when a user is removed from a collaborative document.

In at least one example, the collaborative document component 120 can receive request(s) or other indication(s) to create a collaborative document for collaboration amongst users, as described herein. In such examples, user interface(s) are generated via user computing device(s) of user(s) associated with the collaborative document. Additionally, the collaborative document component 120 can integrate communications, documents, files, etc. that take place within the communication channel into the collaborative document. For example, the collaborative document may be populated with information that was shared between users in the communication channel in an organized manner. The collaborative document component 120 can also facilitate communications within the collaborative document, as well as content sharing (e.g., screen sharing), file uploads, link sharing, and so forth.

In at least one example, the operating system 122 can manage the processor(s) 108, computer-readable media 110, hardware, software, etc. of the server(s) 102.

The collaborative document component 120 may also determine user interactions that indicate one or more interactions of one or more users with the collaborative document. For example, the collaborative document component 120 may determine such interactions from the user computing device(s), such as whether the user account is viewing the collaborative document, presenting content, screen-sharing, typing messages within the thread, and so forth.

In at least one example, the datastore 124 can be configured to store data that is accessible, manageable, and updatable. In some examples, the datastore 124 can be integrated with the server(s) 102, as shown in FIG. 1. In other examples, the datastore 124 can be located remotely from the server(s) 102 and can be accessible to the server(s) 102 and/or user device(s), such as the user computing device 104. The datastore 124 can comprise multiple databases, which can include user/org data 126 and/or collaborative document data 128. Additional or alternative data may be stored in the data store and/or one or more other data stores.

In at least one example, the user/org data 126 can include data associated with users of the communication platform. In at least one example, the user/org data 126 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the user/org data 126 can include permission data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. Permissions associated with an individual user can be mapped to, or otherwise associated with, an account or profile within the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the user/org data 126 can include data associated with one or more organizations of the communication platform. In at least one example, the user/org data 126 can store data in organization profiles, which can store data associated with an organization, including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In some examples, the user/org data 126 may include permissions of the users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user/org data 126. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In some examples, the user/org data 126 can store data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on channel(s) associated with individual groups, restrictions on user(s) associated with individual groups, and the like. In at least one example, the permissions can support the communication platform by maintaining security for limiting access to a defined group of users. In some examples, such groups can be defined by common access credentials, group identifiers, or the like, as described above.

In some examples, the user/org data 126 can store data associated with permissions of individual communication channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a channel can be mapped to, or otherwise associated with, data associated with the communication channel. In some examples, permissions can indicate restrictions on individual channels, restrictions on user(s) associated with individual channels, and the like.

In at least one example, individual users can be associated with particular permissions, users having particular user types and/or roles (e.g., administrator users, reviewers, moderators, etc.) can be associated with particular permissions, objects (e.g., messages or otherwise) can be associated with particular permissions, virtual spaces can be associated with particular permissions, etc. That is, the user/org data 126 can store various permissions for various components of the environment 100. Permissions may also be associated with the collaborative document, such as which users are able to edit, view, etc. the collaborative document, share content within the collaborative document, post messages within the collaborative document, and so forth. In at least one example, the collaborative document component 120 can update instances of the collaborative document presented to users of the collaborative document such that the data associated therewith is updated in real-time or near-real time.

In at least one example, the collaborative document data 128 can include data associated with one or more collaborative documents associated with the communication platform. The collaborative document data 128 can include textual data, audio data, video data, images, files, and/or any other type of data configured to be transmitted in association with the collaborative document, or a virtual meeting associated with the collaborative document. Non-limiting examples of collaborative documents include workspaces, communication channels, direct messaging instances, canvases, and audio and/or video conversations. In at least one example, the collaborative document data 128 can store data associated with individual collaborative documents separately, such as based on a discrete identifier associated with each collaborative document. In some examples, a first collaborative document can be associated with a second collaborative document. In such examples, first collaborative document data associated with the first collaborative document can be stored in association with the second collaborative document. For example, data associated with a collaborative document that is generated in association with a communication channel may be stored in association with the communication channel. For another example, data associated with an audio and/or video conversation that is conducted in association with a communication channel can be stored in association with the communication channel.

As discussed above, each collaborative document of the communication platform can be assigned a discrete identifier that uniquely identifies the virtual space. In some examples, the collaborative document identifier associated with the virtual meeting can include a physical address in the collaborative document data 128 where data related to that collaborative document is stored. A collaborative document may be "public," which may allow any user within an organization (e.g., associated with an organization identifier) to join and participate in the data sharing through the collaborative document, or a collaborative document may be "private," which may restrict data communications in the collaborative document to certain users or users having appropriate permissions to view.

In some examples, the datastore 124 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 124 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared virtual space).

In some examples, individual groups can be associated with a database shard within the datastore 124 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a virtual space can be associated with a database shard within the datastore 124 that stores data related to a particular virtual space identification. For example, a database shard may store electronic communication data associated with the virtual space, which enables members of that particular virtual space to communicate and exchange data with other members of the same virtual space in real time or near-real time. As discussed above, the communications via the virtual space can be synchronous and/or asynchronous. In at least one example, a group or organization can be the owner of the database shard and can control where and how the related data is stored.

In some examples, individual users can be associated with a database shard within the datastore 124 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), HyperText Transfer Protocols (HTTPs), etc.

The server(s) 102 can further be equipped with various input/output devices 114 (e.g., I/O devices). The I/O devices 114 can include a display, various user interface controls (e.g., buttons, joystick, keyboard, mouse, touch screen, etc.), audio speakers, connection ports and so forth.

In at least one example, the user computing device 104 can include one or more processor(s) 130, computer-readable media 132, one or more communication interface(s) 134, and input/output devices 136.

In at least one example, each processor of the processor(s) 130 can be a single processing unit or multiple processing units, and can include single or multiple computing units or multiple processing cores. The processor(s) 130 can comprise any of the types of processors described above with reference to the processor(s) 108 and may be the same as or different than the processor(s) 108.

The computer-readable media 132 can comprise any of the types of computer-readable media 132 described above with reference to the computer-readable media 110 and may be the same as or different than the computer-readable media 110. Functional components stored in the computer-readable media can optionally include at least one application 138 and an operating system 140.

In at least one example, the application 138 can be a mobile application, a web application, or a desktop application, which can be provided by the communication platform or which can be an otherwise dedicated application. In some examples, individual user computing devices associated with the environment 100 can have an instance or versioned instance of the application 138, which can be downloaded from an application store, accessible via the Internet, or otherwise executable by the processor(s) 130 to perform operations as described herein. That is, the application 138 can be an access point, enabling the user computing device 104 to interact with the server(s) 102 to access and/or use communication services available via the communication platform. In at least one example, the application 138 can facilitate the exchange of data between and among various other user computing devices, for example, via the server(s) 102. In at least one example, the application 138 can present user interfaces, as described herein. In at least one example, a user can interact with the user interfaces via touch input, keyboard input, mouse input, spoken input, or any other type of input.

A non-limiting example of a user interface 142 is shown in FIG. 1. As illustrated in FIG. 1, the user interface 142 can present data associated with one or more communication channels, which may include one or more workspaces. That is, in some examples, the user interface 142 can integrate data from multiple workspaces into a single user interface so that the user (e.g., of the user computing device 104) can access and/or interact with data associated with the multiple workspaces that he or she is associated with and/or otherwise communicate with other users associated with the multiple workspaces. In some examples, the user interface 142 can include a first region 144, or pane, that includes indicator(s) (e.g., user interface element(s) or object(s)) associated with workspace(s) with which the user (e.g., account of the user) is associated and/or indicator(s) (e.g., user interface element(s), affordance(s), object(s), etc.) representing data associated with the workspace(s) with which the user (e.g., account of the user) is associated. In at least one example, the first region 144 can represent a sidebar of the user interface 142.

In at least one example, the user interface 142 can include a second region 146, or pane, that can be associated with a data feed (or, "feed") indicating messages posted to and/or actions taken with respect to one or more communication channels for facilitating communications as described herein. In at least one example, data associated with the second region 146 can be associated with the same or different workspaces. That is, in some examples, the second region 146 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the second region 146 presents data associated with multiple workspaces, at least some data can be associated with an indication of which workspace the data is associated with. Additional details associated with the user interface 142, and the second region 146, are described below with reference to FIG. 2.

The user interface 142 is shown displaying an affordance 148 to generate, or otherwise create, a virtual meeting and a collaborative document associated with the communication channel being accessed by the user (e.g., ChannelA). In some examples, the affordance 148 is displayed subsequent to a cursor of the user (e.g., the input/output devices 136) hovering over a particular area of a message (or other object)

within the communication channel, or the message itself. The affordance 148 allows the user to create, or request a creation, of the collaborative document in association with the virtual meeting. For example, as the user interface 142 illustrates in FIG. 1, users of the communication channel (e.g., ChannelA) may be communicating via text-based messages. However, in some examples, the users may desire to interact via audio and/or video. Here, to create a virtual meeting with audio and/or video capability, one of the users may request the virtual meeting via selecting the affordance 148. As will be explained herein, the virtual meeting may be requested from different messages, links, and other objects posted within the communication channel. An object can include a text document, an image, a video, or any other file or data item. Additionally, as will be explained herein, in response to requesting the virtual meeting, the collaborative document is generated and provides a coworking space in which users may engage in audio and/or video communications, in addition to or alternative from, text-based communications. Additionally, within the virtual meeting, users may share documents, content, links, and so forth.

In at least one example, the operating system 140 can manage the processor(s) 130, computer-readable media 132, hardware, software, etc. of the server(s) 102.

The communication interface(s) 134 can include one or more interfaces and hardware components for enabling communication with various other devices (e.g., the user computing device 104), such as over the network(s) 106 or directly. In some examples, the communication interface(s) 134 can facilitate communication via Websockets, APIs (e.g., using API calls), HTTPs, etc.

The user computing device 104 can further be equipped with various input/output devices 136 (e.g., I/O devices). Such I/O devices 136 can include a display, various user interface controls (e.g., buttons, joystick, keyboard, mouse, touch screen, etc.), audio speakers, connection ports and so forth.

While techniques described herein are described as being performed by the messaging component 116, the audio/video component 118, the collaborative document component 120, and the application 138, techniques described herein can be performed by any other component, or combination of components, which can be associated with the server(s) 102, the user computing device 104, or a combination thereof.

Figure 2:
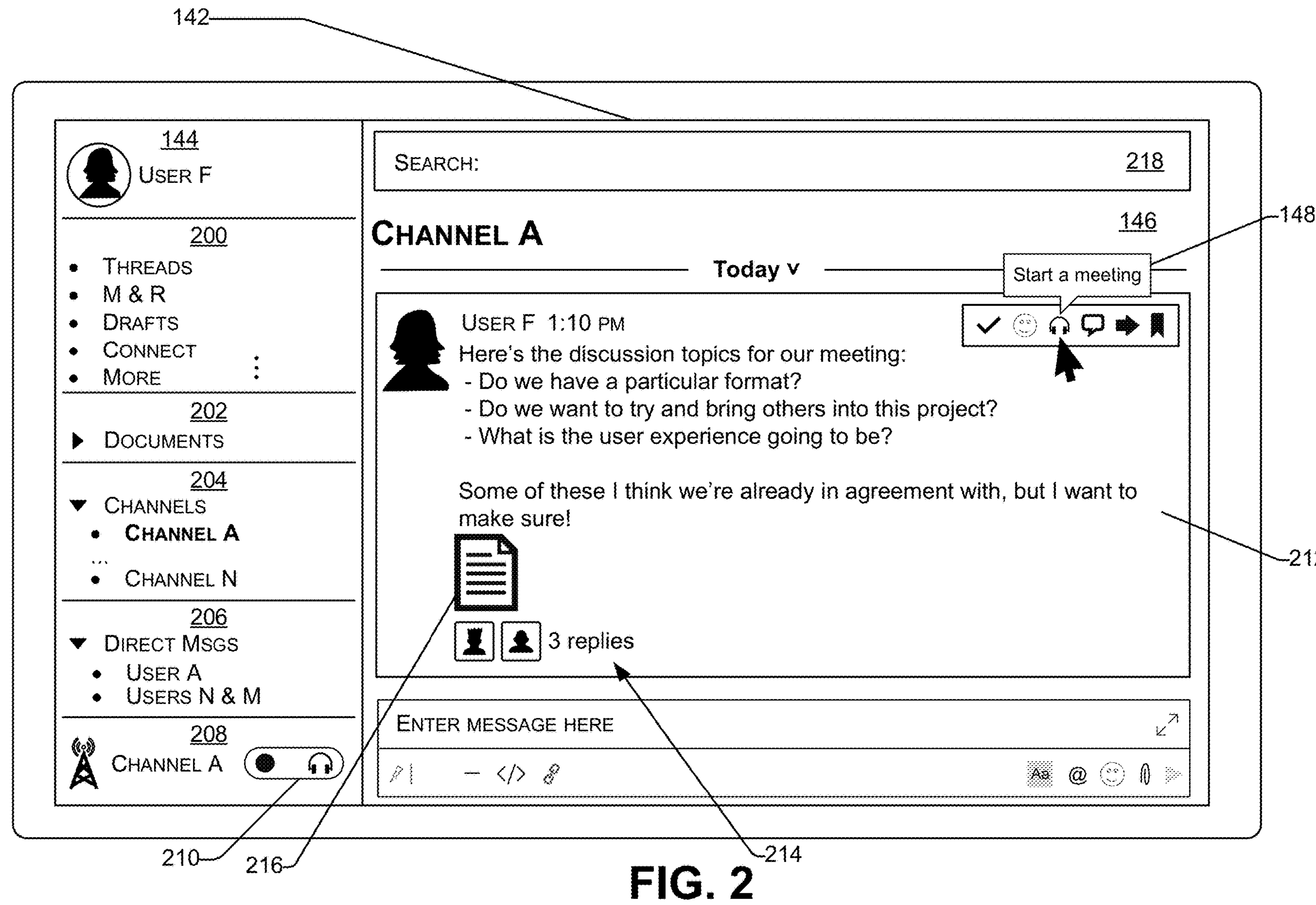
FIG. 2 illustrates an example user interface for requesting a virtual meeting, as described herein.

FIG. 2 illustrates additional details associated with the user interface 142 that presents data associated with communication channels, virtual spaces, or collaborative documents, as described above with reference to FIG. 1.

As described above, in at least one example, the user interface 142 can include the first region 144 or pane, that includes indicator(s) (e.g., user interface element(s) or object(s)) of workspace(s) with which the user (e.g., account of the user) is associated and/or indicator(s) (e.g., user interface element(s) or object(s)) representing virtual space(s) associated with the workspace(s) with which the user (e.g., account of the user) is associated. In at least one example, the first region 144 can represent a sidebar of the user interface 142.

In at least one example, the first region 144 can include one or more sub-sections, or sub-panes, which can represent different virtual spaces. For example, a first sub-section 200 can include indicators representing virtual spaces that can aggregate data associated with a plurality of virtual spaces of which the user is a member. In at least one example, each virtual space can be associated with an indicator in the first sub-section 200. In some examples, an indicator can be associated with an actuation mechanism (e.g., affordance) such that when actuated, can cause the application 138 to present data associated with the corresponding virtual space via the second region 146. In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second region 146, for example, in a feed. In such examples, different types of events and/or actions, which can be associated with different virtual spaces, can be presented via a same feed. In some examples, such data can be organized and/or is sortable by associated virtual space (e.g., virtual space via which the communication was transmitted), time, type of action, user, and/or the like. In some examples, such data can be associated with an indication of which user (e.g., member of the associated virtual space) posted the message and/or performed an action.

In some examples, a virtual space can be associated with a same type of event and/or action. For example, "threads" can be associated with messages, files, etc. posted in threads to messages posted in a virtual space and "mentions and reactions" (e.g., "M & R") can be associated with messages or threads where the user (e.g., User F) has been mentioned (e.g., via a tag) or another user has reacted (e.g., via an emoji, reaction, or the like) to a message or thread posted by the user. That is, in some examples, same types of events and/or actions, which can be associated with different virtual spaces, can be presented via a same feed. As with the "unreads" virtual space, data associated with such virtual spaces can be organized and/or is sortable by virtual space, time, type of action, user, and/or the like.

In some examples, a virtual space can be associated with facilitating communications between a user and other users of the communication platform. For example, "connect" can be associated with enabling the user to generate invitations to communicate with one or more other users. In at least one example, responsive to receiving an indication of selection of the "connect" indicator, the communication platform can cause a connections interface to be presented in the second region 146.

In some examples, a virtual space can be associated with a group (e.g., organization, team, etc.) headquarters (e.g., administrative or command center). In at least one example, the group headquarters can include a virtual or digital headquarters for administrative or command functions associated with a group of users. For example, "HQ" can be associated with an interface including a list of indicators associated with virtual spaces configured to enable associated members to communicate. In at least one example, the user can associate one or more virtual spaces with the "HQ" virtual space, such as via a drag and drop operation. That is, the user can determine relevant virtual space(s) to associate with the virtual or digital headquarters, such as to associate virtual space(s) that are important to the user therewith.

Though not illustrated, in some examples, a virtual space can be associated with one or more boards or documents with which the user is associated. In at least one example, if the user requests to access the virtual space associated with one or more documents with which the user is associated, the one or more documents can be presented via the user interface 142 (e.g., in the second region 146). In at least one example, the documents, as described herein, can be associated with an individual (e.g., private document for a user), a group of users (e.g., collaborative document), and/or one or more communication channels (e.g., members of the communication channel rendered access permissions to the document), such as to enable users of the communication platform to create, interact with, and/or view data associated with such documents.

Additionally, though not illustrated, in some examples, a virtual space can be associated with one or more canvases with which the user is associated. In at least one example, the canvas can include a flexible canvas for curating, organizing, and sharing collections of information between users. That is, the canvas can be configured to be accessed and/or modified by two or more users with appropriate permissions. In at least one example, the canvas can be configured to enable sharing of text, images, videos, GIFs, drawings (e.g., user-generated drawing via a canvas interface), gaming content (e.g., users manipulating gaming controls synchronously or asynchronously), and/or the like. In at least one example, modifications to a canvas can include adding, deleting, and/or modifying previously shared (e.g., transmitted, presented) data. In some examples, content associated with a canvas can be sharable via another virtual space, such that data associated with the canvas is accessible to and/or rendered interactable for members of the virtual space.

In some examples, if the first sub-section 200 includes a user interface element representative of a virtual space associated with audio and/or video communications (e.g., conversations, multimedia clips (e.g., videos, audio files, stories, etc.), etc.) that is actuated by a user, audio and/or video data associated with the user, which can be associated with different audio and/or video conversations, multimedia clips, stories, and/or the like, can be presented via the second region 146. In some examples, such audio and/or video data can be presented via a feed. For the purpose of this discussion, audio and/or video data can correspond to audio and/or video content provided by a user associated with the communication platform.

The first region 144 of the user interface 142 can also include a second sub-section 202, or sub-pane, that is a personalized sub-section associated with personal documents that are associated with the user account. In at least one example, the user can select personal documents to associate with the second sub-section 202, such as by dragging and dropping, pinning, or otherwise associating selected personal documents into the second sub-section 202. As discussed above, personal documents can include collaborative documents in which the user is a sole member. For example, a personal document can include a to do list, a document with saved items, and/or the like.

In at least one example, the first region 144 of the user interface 142 can include a third sub-section 204, or sub-pane, that includes indicators representing communication channels. In some examples, the communication channels can include public channels, private channels, shared channels (e.g., between groups or organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In at least one example, if a communication channel is cross-workspace (e.g., associated with different workspaces), the user may be associated with both workspaces, or may only be associated with one of the workspaces. In some examples, the communication channels represented can be associated with combinations of communication channels associated with a single workspace and communication channels associated with different workspaces.

In some examples, the third sub-section 204 can depict all communication channels, or a subset of all communication channels, that the user has permission to access (e.g., as determined by the permission data). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the third sub-section 204 can depict all communication channels, or a subset of all communication channels, that the user is a member of, and the user can interact with the user interface 142 to browse or view other communication channels that the user is not a member of but are not currently displayed in the third sub-section 204. In some examples, different types of communication channels (e.g., public, private, shared, cross-workspace, etc.) can be in different sections of the third sub-section 204, or can have their own sub-regions or sub-panes in the user interface 142. In some examples, communication channels associated with different workspaces can be in different sections of the third sub-section 204, or can have their own regions or panes in the user interface 142.

In at least one example, the second region 146 can include a fourth sub-section 206, or sub-pane, that can include indicators representative of communications with individual users or multiple specified users (e.g., instead of all, or a subset of, members of an organization). Such communications can be referred to as "direct messages." That is, the fourth sub-section 206, or sub-pane, can include indicators representative of virtual spaces that are associated with private messages between one or more users.

In at least one example, the second region 146 can include a fifth sub-section 208, or sub-pane, that can include indicators representative of starting a virtual meeting with audio and/or video capabilities. For example, the fifth sub-section 208 may include an affordance 210 in which the user may toggle to request the virtual meeting. In response, the user interface 142 may cause a collaborative document to be presented within the second region 146, and the users may communicate with audio and/or video. Additionally, as will be explained herein, as part of requesting the collaborative document, one or more users associated with the collaborative document may be identified. Additionally, as introduced above, the collaborative document may also be requested via the affordance 148 presented within the second region 146. In some examples, and as will be explained herein, the affordance 148 may be selected to create a virtual meeting around a specific message within the communication channel, while the affordance 210 may be selected to create a virtual meeting, disassociated with the communication channel.

That is, selecting the affordance 210 may request a collaborative document independent of an existing communication channel in the communication platform. In such examples, the request can be received in association with a user account of a requesting user and the requesting user may be a sole member of the collaborative document, until the collaborative document is shared with one or more additional users or until other users are invited to the collaborative document. In some examples, the request can be received in association with a virtual meeting that includes audio and/or video communications.

As described above, in at least one example, the user interface 142 can include the second region 146, or pane, that is associated with a feed indicating messages posted to and/or actions taken with respect to a virtual space (e.g., a virtual space associated with direct message communication (s), a virtual space associated with communication channel communication(s), a virtual space associated with collaborative document communication(s) (e.g., via a messaging or chat interface within a collaborative document), a virtual space associated with audio and/or video communications, etc.) for facilitating communications. In FIG. 2, the user (e.g., User F), can interact with the user interface 142 to view data associated with the virtual space and/or to request the collaborative document via the affordance 148.

In some examples, the collaborative document may be requested from, or in association with, messages (or other objects) posted within the communication channel. These messages may include, but are not limited to, text (e.g., which can be editable), a file (e.g., text, audio, video, an application, etc.), a task to be completed, a ticket to be resolved, an event (e.g., scheduled event, calendar invitation, calendar instance, etc.), a message previously transmitted via the communication platform, an image, a graphic, a link to a local object, a link to a remote object (e.g., third-party object), and/or the like. As an example, as part of the request, the communication platform can identify one or more objects to be associated with the virtual meeting. In some examples, the communication platform can identify the object(s) based on user input from the creating user (e.g., the first user). For example, the first user may request the virtual meeting to be created in association with a particular document shared within the communication channel. Here, based on the user input, the communication platform can cause the virtual meeting and the collaborative document to be created around the document. This may, in some examples, allow the users to form a meeting centered around the document.

More particularly, in FIG. 2, an indicator 212 of a message is shown being presented within the second region 146. This indicator 212 may have been generated by the user (e.g., UserF) in response to other communications within the communication channel (e.g., ChannelA). As illustrated, other users may have replied to this message, represented by an indicator 214 (e.g., a user interface element, object, etc.), which is associated with a communication channel (e.g., #ChannelA). The other users may additionally or alternatively react to the message by emojis and the like. Furthermore, the user may have uploaded a document, which is represented by an affordance 216. For purposes of this discussion, a "message" can refer to any electronically generated digital object provided by a user using the user computing device 104 and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device). For example, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like.

In some examples, a user can comment on a message in a "thread." A thread can be a message associated with another message that is not posted to a communication channel, but instead, is maintained within an object associated with the original message. Messages and/or threads can be associated with file(s), emoji(s), app(s), etc. For example, with regard to the indicator 214 of the message, there have been three replies to the message of User F, and these replies are "threads" to the message of the user (e.g., UserF).

A communication channel or other virtual space can be associated with data and/or content other than messages, or data and/or content that is associated with messages. For example, non-limiting examples of additional data that can be presented via the second region 146 of the user interface 142 include collaborative documents (e.g., documents that can be edited collaboratively, in real-time or near real-time, etc.), audio and/or video data associated with a conversation, members added to and/or removed from the communication channel, file(s) (e.g., file attachment(s)) uploaded and/or removed from the communication channel), application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc.

In some examples, the second region 146 can comprise a feed associated with a single virtual meeting and/or a single collaborative document. In such examples, data associated with the collaborative document can be presented via the feed. In at least one example, data associated with a collaborative document can be viewable to at least some of the users of a group of users associated with a same group identifier, such as users with appropriate permissions to access the collaborative document. In some examples, for members of a collaborative document, the content of the collaborative document (e.g., messaging communications) can be displayed to each member of the collaborative document. For instance, a common set of group-based messaging communications can be displayed to each member of the collaborative document such that the content of the collaborative document (e.g., messaging communications) may not vary per member of the collaborative document. In some examples, data associated with a collaborative document can appear differently for different users (e.g., based on personal configurations, group membership, etc.).

In at least one example, the format of the collaborative documents may appear differently to different users. In some examples, the format of the collaborative documents may appear differently based on which workspace a user is currently interacting with or most recently interacted with. In some examples, the format of the individual virtual spaces may appear differently for different users (e.g., based on personal configurations, group membership, etc.).

As will be explained herein, in response to requesting a virtual meeting and generating the collaborative document, invites may be sent to other users. In some examples, the invites may indicate the object in which the virtual meeting is created (e.g., the message), to provide a context of the virtual meeting and to indicate to other users why the virtual meeting is being scheduled.

In at least one example, the user interface 142 can include a search mechanism 218, wherein a user can input a search term and the server(s) 102 can perform a search associated with the communication platform. In some examples, the search can be performed across each workspace with which the user is associated, or the search can be restricted to a particular workspace, based on a user specification.

The user interface 142 is a non-limiting example of a user interface that can be presented via the user computing device 104 (e.g., by the application 138). In some examples, the application 138 can receive data from the messaging component 116, the audio/video component 118, and/or the collaborative document component 120 and the application 138 can generate and present the user interface 142 based on the data. In other examples, the application 138 can receive data from the messaging component 116 and/or the audio/video component 118, and instructions for generating the user interface 142 from the messaging component 116, the audio/video component 118, and/or the collaborative document component 120. In such an example, the application 138 can present the user interface 142 based on the instructions. Additional or alternative data can be presented via a user interface and additional or alternative configurations can be imagined.

Figure 3:
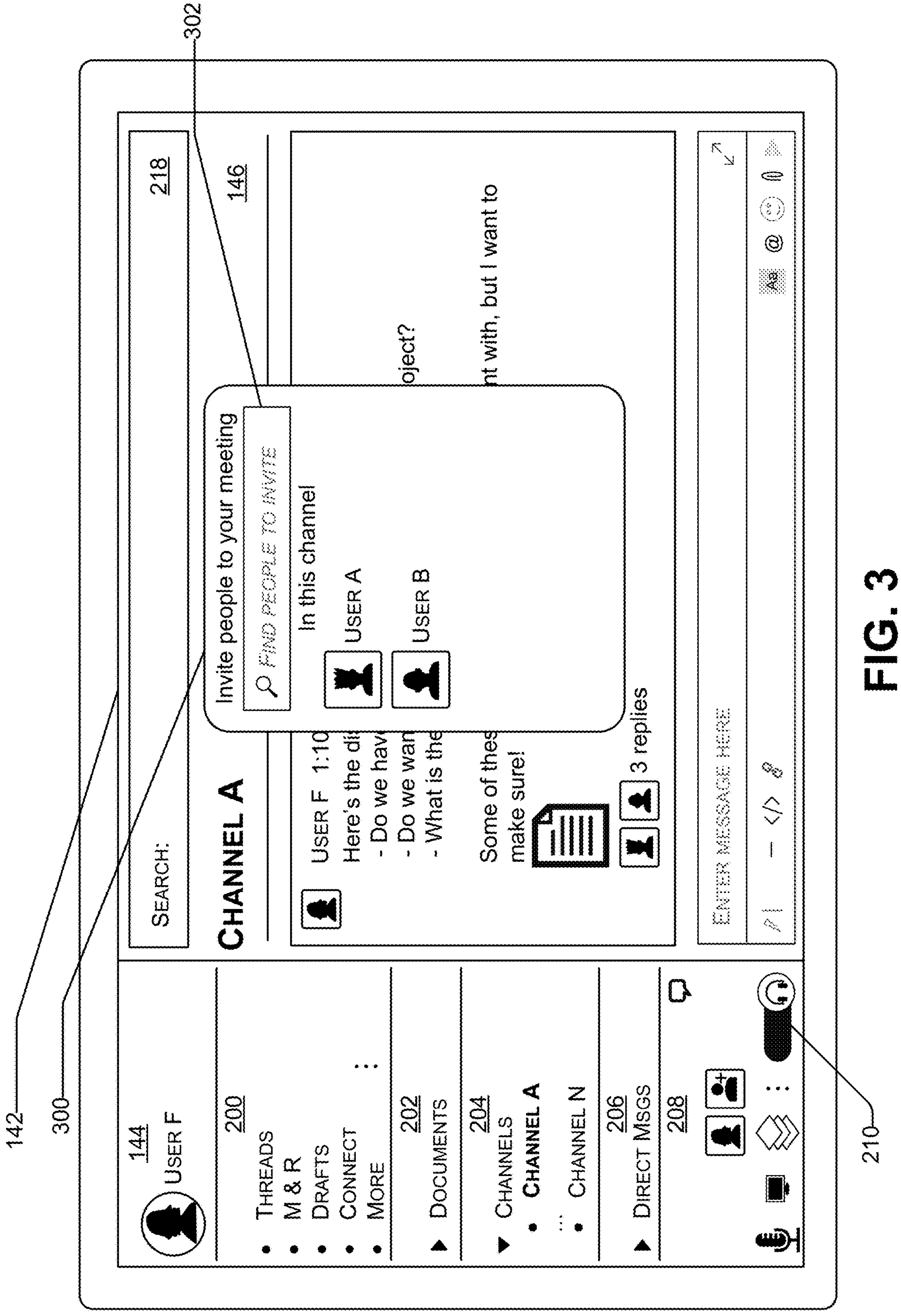
FIG. 3 illustrates an example user interface for inviting users to a virtual meeting, as described herein.

FIG. 3 illustrates an example user interface 142 for inviting users to a virtual meeting. For example, the user interface 142 is shown displaying a window 300. In some examples, the window 300 may be displayed following a user making a selection of the affordance 148 or the affordance 210. For example, in response to requesting the virtual meeting, the user interface 142 may display the window 300.

The window 300 includes a field 302 that allows the user to enter names of users to invite to the virtual meeting, or to search for users to invite to the virtual meeting. In some examples, the window 300 may present a list of users that are members of the communication channel (e.g., ChannelA) to increase an ease of inviting users to the virtual meeting. The user may select affordances of the users to invite the users, respectively, into the virtual meeting.

As further shown in FIG. 3, the affordance 210 may been actuated (e.g., toggled on) to indicate that the user is requesting the virtual meeting. In response, the fifth sub-section 208 may indicate the users within the virtual meeting (or which have been invited to the virtual meeting). Additionally, or alternatively, the fifth sub-section 208 may include affordances for enabling audio, sharing content, messaging, and so forth.

Figure 4:
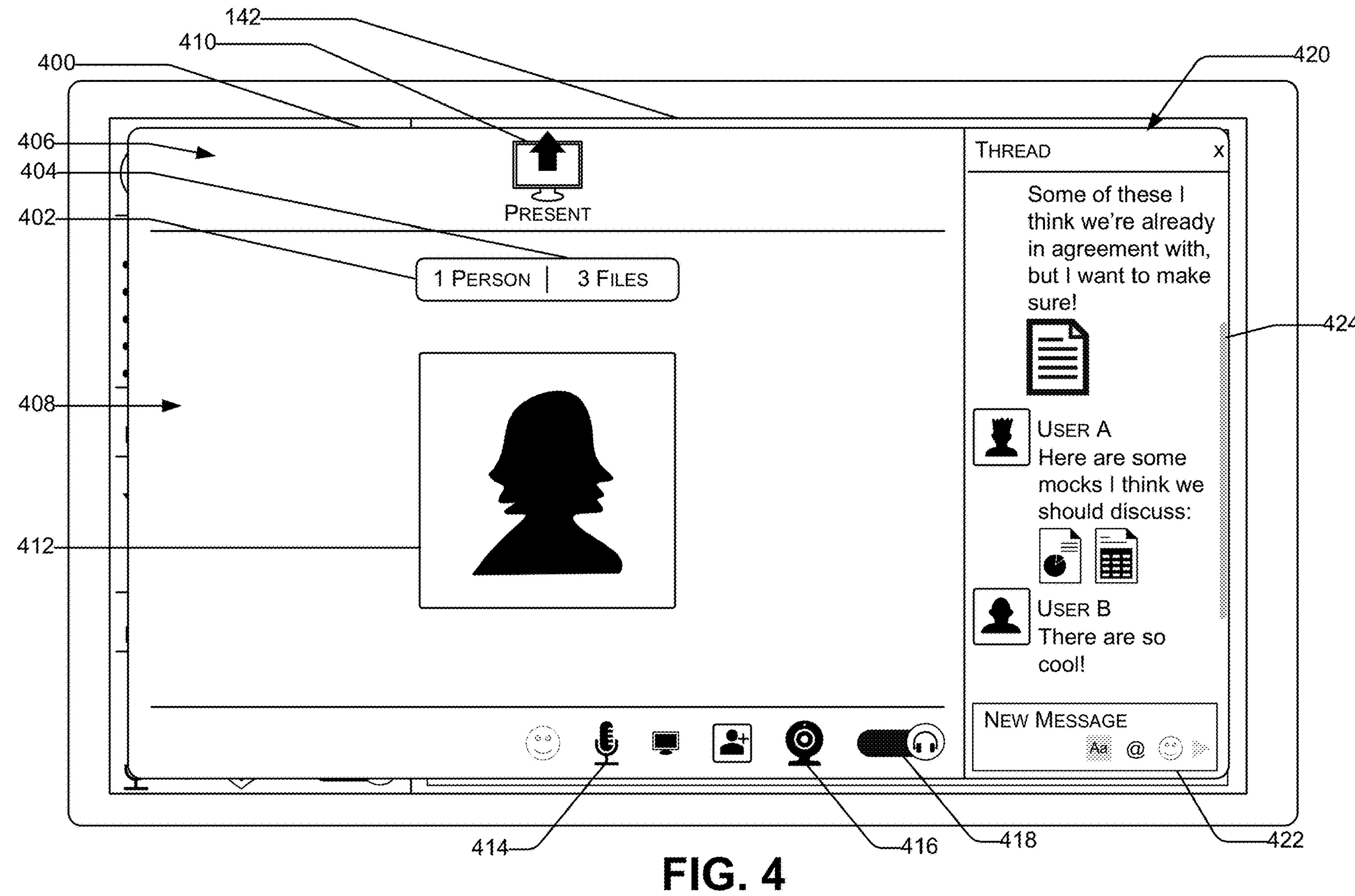
FIG. 4 illustrates an example user interface showing a collaborative document being generated in association with a virtual document, as described herein.

FIG. 4 illustrates an example user interface 142 showing a collaborative document 400 being generated in response to a virtual meeting being scheduled. The collaborative document 400, as indicated above, is presented via the user interface 142 and includes the functionalities associated with a virtual space, such as a communication channel in which users may collaborate. In some examples, the collaborative document 400 can be a virtual space, a board, a canvas, a page, or the like for collaborative communication and/or data organization within the communication platform. In at least one example, the collaborative document 400 can support editable text and/or objects that can be ordered, added, deleted, modified, and/or the like. In some examples, the collaborative document 400 can be associated with permissions defining which users of a communication platform can view and/or edit the document.

The collaborative document 400 includes a first indication 402 of the users and a second indication 404 of files. The users may be those users that are invited to collaborate within the collaborative document 400, and the files may be those files that were shared within the communication channel. For example, the collaborative document 400 may be created from the communication channel, or certain communications (e.g., messages) within the communication channel. Files that were shared (e.g., uploaded, posted, etc.) into the communication channel may be populated within the collaborative document 400. This allows users within the collaborative document 400 to easily access previously shared files within the communication channel, and may avoid the users toggling between windows to access the files.

In some examples, the collaborative document 400 may include a first area 406 and a second area 408. The first area 406 may be disposed vertically above the second area 408. Users may share content within the collaborative document 400 by selecting a presentation affordance 410. In some examples, the presentation affordance 410 allows the users to share their screens (e.g., share screen), respectively. In some examples, upon selecting the presentation affordance 410, the content may be presented within the second area 408. In turn, an icon 412 of the user (as well as other users in the collaborative document 400) may be presented vertically above, vertically below, beside, etc. the second area 408.

The second area 408, or portion of the collaborative document 400, may represent an area in which files are presented, screens are shared, video streams are presented, and so forth. For example, in FIG. 3, the icon 412 associated with a user (e.g., User F) is displayed in the second area 408. In some examples, the icon 412 is displayed following a selection of the first indication 402. For example, users may select the first indication 402 to view those users that are collaborating within the collaborative document 400. Here, the user (e.g., User F) is shown being the only user within the collaborative document 400, however, as other users join, the collaborative document 400 (and the icons) may be updated.

The collaborative document 400 may also include one or more affordances for interacting within the collaborative document 400. For example, an audio affordance 414 allows the user to mute or unmute themselves. A video affordance 416 allows the user to turn on and off their camera. In examples when the user turns on their camera, the second area 408 may present a live stream (e.g., feed) of image/video data of the user(s). A meeting affordance 418, which may be similar to affordance 210, allows the user to terminate (e.g., leave) the collaborative document 400. For example, in FIG. 4, the meeting affordance 418 is shown being toggled on, whereby the user is engaged within the collaborative document 400. If the user desires to leave the collaborative document 400, the user may select (e.g., click) the meeting affordance 418 to toggle the meeting affordance 418 off. In response, the user may be directed back to the communication channel, as shown in FIG. 2, for example. Other affordances may allow the user to invite others to the collaborative document 400, react to content being shared within the collaborative document 400 (e.g., emojis, likes, etc.), and so forth.

The collaborative document 400 further includes a thread 420 in which users within the collaborative document 400 communicate. Messages are posted within the thread 420. In some examples, the users may type within the thread 420, upload/share documents, respond to other messages, and so forth. For example, the thread 420 may include a messaging box 422 that allows users within the collaborative document 400 to communicate. In non-limiting examples, users may type within the messaging box 422, upload images, documents, and so forth, react to posts, and so forth. In response to a message, the messaging component 116 may cause the collaborative document 400 to update and display the message. In some examples, the messaging component 116 can be configured to identify a mention or tag. In at least one example, the mention or tag can include an @mention (or other special character) of a user identifier that is associated with the communication platform. The user identifier can include a username, real name, or other unique identifier that is associated with a particular user. In response to identifying the mention or tag of the user identifier, the messaging component 116 can cause a notification to be presented on a user interface associated with the user identifier.

In some examples, the thread 420 is preloaded or otherwise populated with messages that occurred within the communication channel. In this sense, the collaborative document 400 may include a canvas that is generated using the communications, files, etc. that were shared in the communication channel, or in association with the object. For example, the thread 420 is shown displaying three messages, where two of the messages include files. These messages, and files, may have been posted within the communication channel around the object that the collaborative document 400 was created. In this sense, the collaborative document 400 may not include all of the communications that transpired within the communication channel, but only those around the object in which the collaborative document 400 was created. By populating the collaborative document 400 with the communications that took place in the communication channel, the users of the collaborative document 400 are able to quickly and easily determine a context and previous communications that transpired. As such, messages and/or data exchanged via the communication channel prior to the virtual meeting being scheduled can be accessible to the users.

For example, returning briefly to FIG. 2, the user (e.g., UserF) posted the message, and three replies are shown (e.g., via the indicator 214). The thread 420, in FIG. 4, includes the message posted by the user, as well as the replies of the other users (e.g., the three replies). A scroll 424 is provided to allow the user to view these replies, as well as the message. Additionally, the affordance 216 of the document as included in the message by the user is further displayed in the thread. This document may additionally or alternatively be access via the second indication 404 associated with the files. In some examples, selecting the affordance 216 of the document, or affordances of other documents in the thread, may open a new window, application, popup, etc. for viewing the document.

The collaborative document 400 allows the users to use links, files, slides, documents, screen share, audio, video, and so forth as a way to record communications, content, etc. when meeting about a particular object. In some examples, the collaborative document 400 provides an archive to be referenced, edited, added to, etc. after the virtual meeting takes place. In this manner, the collaborative document 400 is intended to be a collaborative space to share and discuss content in real-time, and afterwards, the collaborative document 400 may be reopened and edited by anyone with access. In some examples, the collaborative document 400 may be used within synchronous or asynchronous work. For example, the collaborative document 400 may be generated independent of the virtual meeting.

Figure 5:
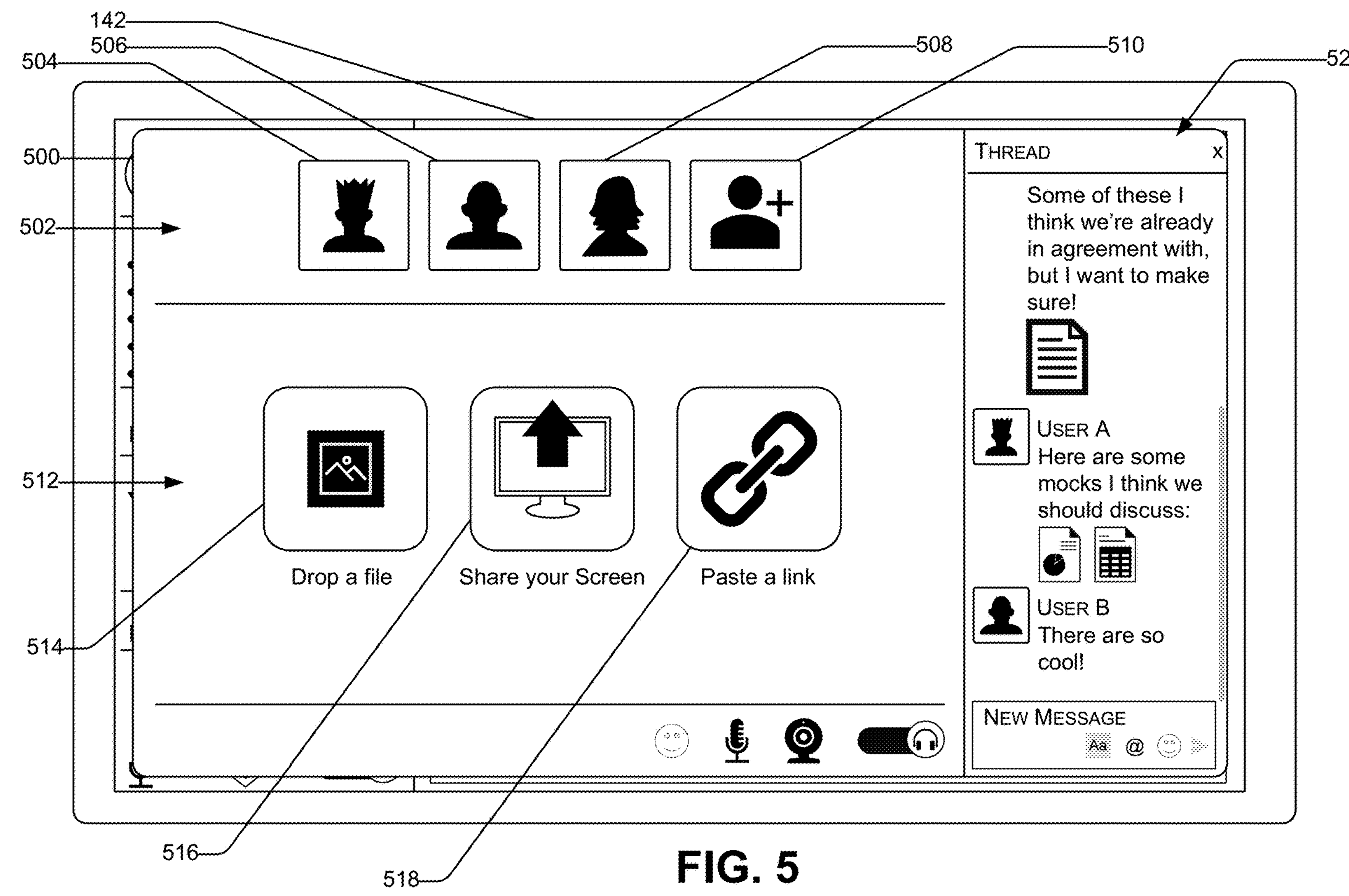
FIG. 5 illustrates an example user interface showing a collaborative document being generated in association with a virtual document, as described herein.

FIG. 5 illustrates an example user interface 142 showing a collaborative document 500 being generated in response to a virtual meeting being scheduled. The collaborative document 500 in FIG. 5 may be similar to the collaborative document 400 discussed above with regard to FIG. 4. However, in FIG. 5, the collaborative document 500 is shown including a different style of canvas, for example.

For example, the collaborative document 500 is shown including a first area 502 that includes icons of the users within the collaborative document 500. The users may respectively include icons (e.g., pictures, images, emojis, etc.) to indicate their presence within the collaborative document 500. For example, a first icon 504 may be associated with a first user, a second icon 506 may be associated with a second user, and a third icon 508 may be associated with a third user. A fourth icon 510 allows users to invite other users to the collaborative document 500.

In some examples, the collaborative document 500 includes a second area 512 located vertically below the first area 502. The second area 512 may include affordances associated with adding a file to the collaborative document 500, sharing a screen within the collaborative document 500, and/or pasting a link into the collaborative document 500 (e.g., URL). For example, a first affordance 514 may be associated with adding a file to the collaborative document 500. In response to selecting the first affordance 514, the collaborative document 500 may include a pop-up window that allows the user to add a file to the collaborative document 500. In some examples, the pop-up window may display files that the user has recently shared within the communication platform (whether within or external to the communication channel).

A second affordance 516 allows the user to share their screen and present content. In such examples, the shared content may be displayed within the second area 512 of the collaborative document 500. The third affordance 518, meanwhile, allows the user to paste a link to the collaborative document 500. For example, the user may provide a link to a third-party document, a website (e.g., URL), etc.). The collaborative document 500 is further shown including a thread 520, which may be similar to the thread 420 as discussed above.

In some examples, the second area 512 may represent a stage of the collaborative document 500 in which content is shared and presented. For example, upon adding a link, an affordance of the link may be presented in the second area 512. As another example, if a file is attached, an affordance of the file may be presented in the second area 512.

As indicated above, when the virtual meeting is started, the collaborative document 500, such as the thread 520, is populated with communications that occurred within the communication channel. In some examples, the messages are based at least in part on the object (e.g., message) that the collaborative document 500 was created around. The collaborative document 500 may represent a virtual canvas that is pre-seeded with content for the virtual meeting, and during the virtual meeting, the content is stored to collect, curate, and discuss work in an asynchronous manner that is more focused than the communication channel. That is, the virtual meeting, or the collaborative document 500 is created around a specific object to center on what's important to the virtual meeting (e.g., file, video, website, etc.). These exchanges are shared in association with the collaborative document 500 to be saved, recorded, and accessed at later instances.

Figure 6:
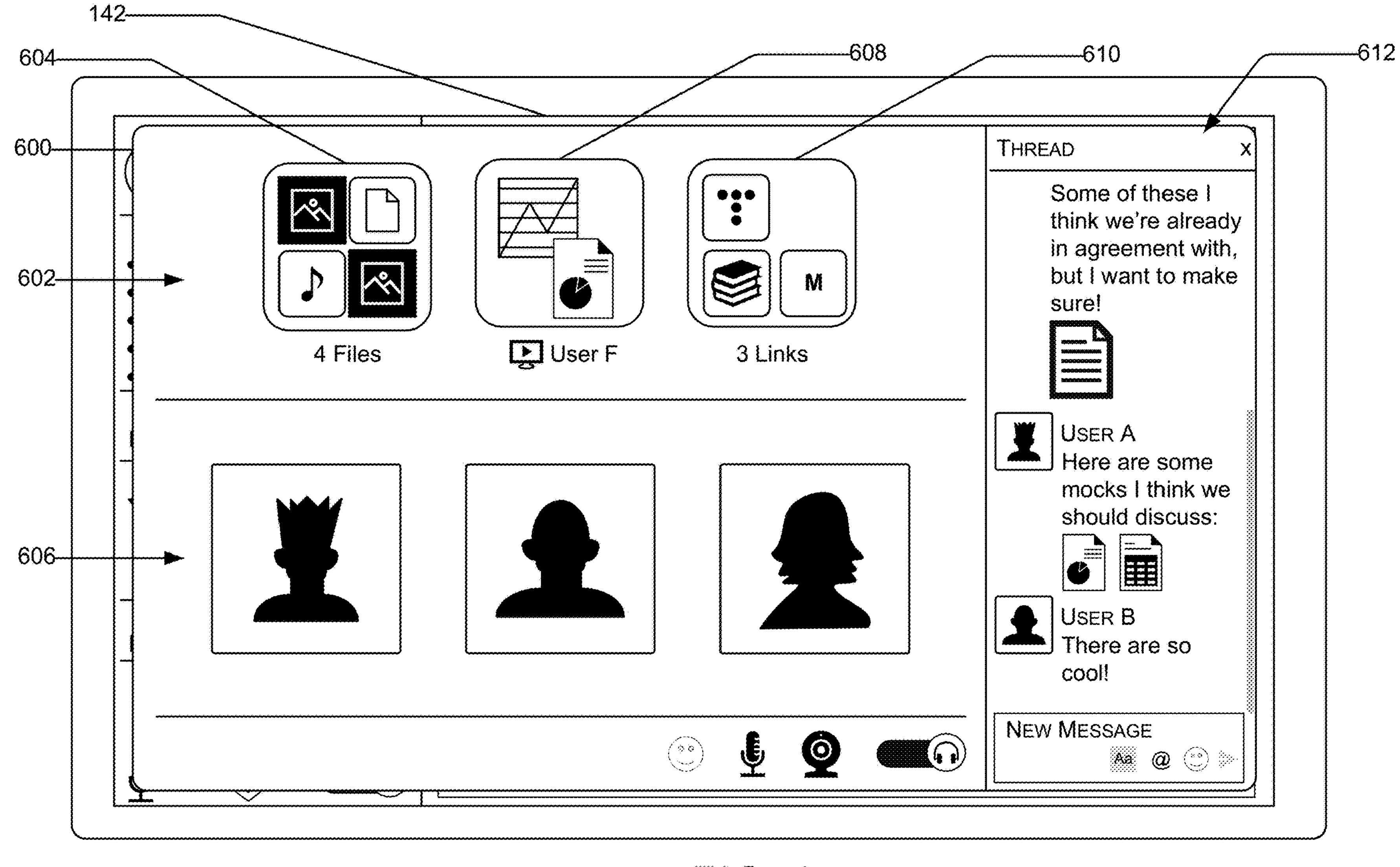
FIG. 6 illustrates an example user interface showing a collaborative document being generated in association with a virtual document, as described herein.

FIG. 6 illustrates an example user interface showing a collaborative document 600 being generated in response to a virtual meeting being scheduled. The collaborative document 600 in FIG. 6 may be similar to the collaborative document 400 discussed above with regard to FIG. 4 and/or the collaborative document 500 discussed above with regard to FIG. 5. However, in FIG. 6, the collaborative document 600 is shown including a different style of canvas, for example.

For example, a first area 602 of the collaborative document 600 may include a first indication 604 of files that were added to the communication channel, or in relation to the object with which the collaborative document 600 was created. As shown, the first indication 604 may include four files that were added (e.g., uploaded) into the communication channel. These files may have been added by any of the users in the communication channel, and the first indication 604 may be displayed to allow the users of the collaborative document 600 to quickly access and view the files (as compared to closing the collaborative document and viewing the files). The users within the collaborative document 600 are permitted to open the files, and in response, an affordance of the file may be displayed within a second area 606 of the collaborative document 600. The first indication 604 is shown including four files that may be selected by the users, however, more than four files may be presented and the user may be permitted to scroll through or toggle between the files in the first indication 604.

A second indication 608 is associated with a shared screen. For example, to view content being shared (or presented) via one of the users, the second indication 608 may be selected. In some examples, upon selecting the second indication 608, the second area 606 may be updated to display the shared screen. The second indication 608 may include a preview of the content being shared by the user (e.g., UserF). A third indication 610, meanwhile, may be associated with files that were posted, uploaded, or included in the communication channel. For example, the links may be to third-party websites, third-party documents, and so forth. In some examples, the users are permitted to add additional files and links other than those included (or gathered) from the communication channel. For example, as discussed above with regard to FIG. 5, users may add files and/or post links. In such examples, the first indication 604 and the third indication 610, respectively, may be updated to indicate the files and the links. Still, in some examples, files and/or links may be added via a thread 612.

The second area 606 is shown displaying icons of the users associated with the collaborative document 600. In some examples, the icons may represent a live video stream of the users, as captured from their respective cameras, and/or a picture (e.g., profile picture) of the users. Users may have the ability to customize or individually select what is being displayed in the second area 606. For example, if the user selects to view one of the files within the second indication 608, the second area 606 may be updated to display the file. In such examples, the icons of the users may be displayed in the first area 602. However, in some examples, the second area 606 may display the icons of the users as well as the files. In such examples, separate windows, screens, and the like may be displayed in the second area 606, and the user may have the options to select what is displayed in the second area 606.

The links, files, and other content (e.g., share screen) that are presented within the collaborative document 600 are archived for later use. For example, within the virtual meeting, users may share their respective screens, upload links, and otherwise share content. This content is stored within the collaborative document 600 for use and/or viewing at a later instance. In other words, the communications and content that is presented within the collaborative document 600 is recorded, and the collaborative document 600 may be accessed at later times. When accessed at a later instance, the collaborative document 600 provides a quick and convenient reference as to the communications that previously transpired. In other words, by archiving the collaborative document 600, the content of the virtual meeting is saved for use at later instances in time.

Figure 7:
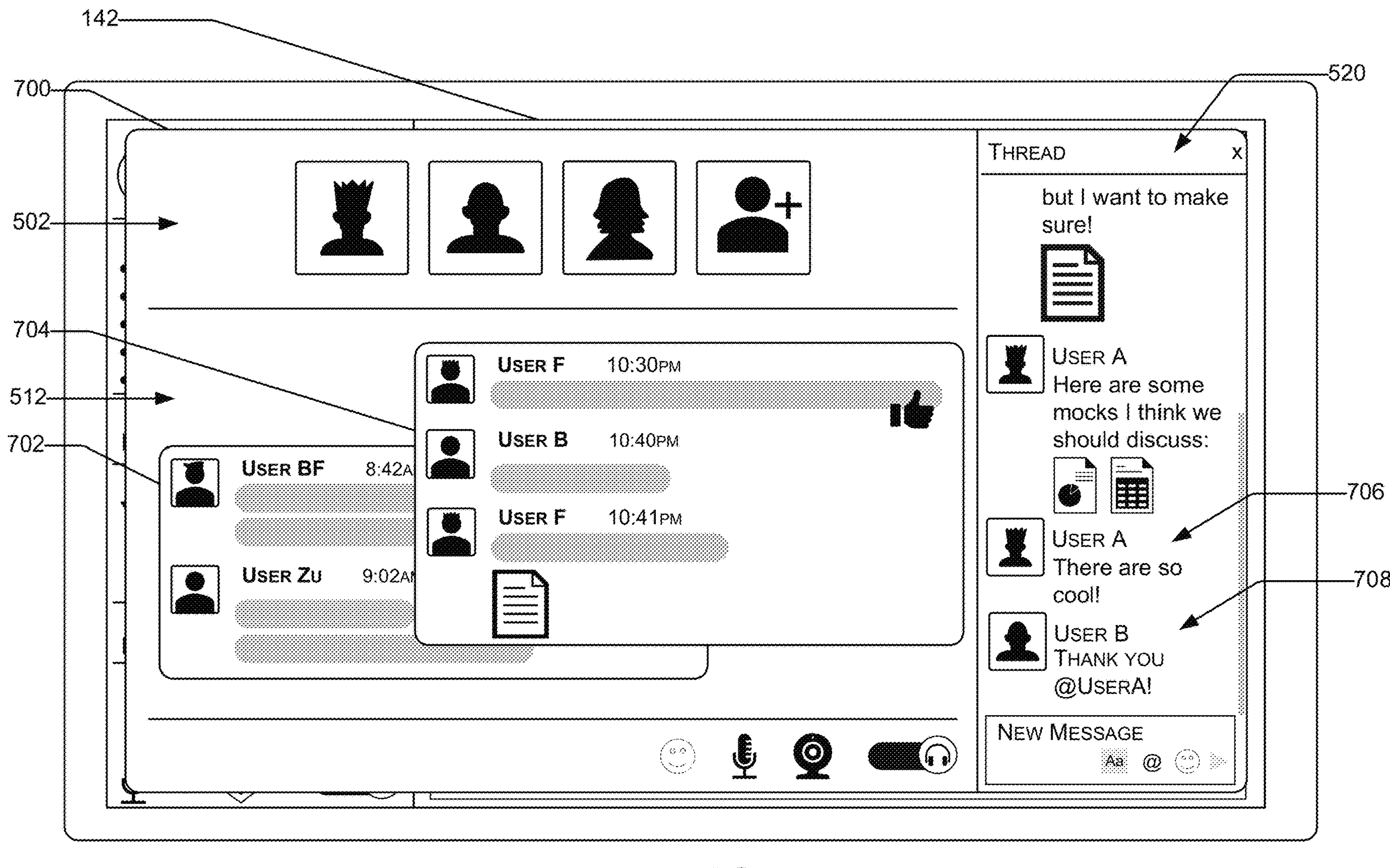
FIG. 7 illustrates an example user interface showing a collaborative document being generated in association with a virtual document, as described herein.

FIG. 7 illustrates an example user interface showing a collaborative document 700 being generated in response to a virtual meeting being scheduled. In some examples, FIG. 7 illustrates the collaborative document 500 of FIG. 5 with content being presented in the second area 512. For example, from the collaborative document 500 illustrated in FIG. 5, one of the users may share their screen. In response, the second area 512 is updated to display a first window 702 and a second window 704. In some examples, the first window 702 and the second window 704 may be presented from a single user, or among different users. In the latter example, the user may toggle between viewing the first window 702 and the second window 704, regardless of which content a presenter is currently sharing. The first area 502 is further shown including icons representative of the users within the collaborative document 700. In some examples, the second area 512 represents a portion of the collaborative document 700 that includes a cluster of applications where users can interact and collaborate.

As additionally shown, the thread 520 allows the users to post messages. For example, users (e.g., User A and UserB) may post messages within the thread 520, such as a first message 706 and a second message 708. The first message 706 and the second message 708 may be populated within the collaborative document 700, and recorded to create a record of the first message 706 and the second message 708. For example, upon exiting the collaborative document 700, the first message 706 and the second message 708 may be populated within the communication channel in association with the object that the collaborative document 700 was created.

In some examples, the collaborative document 700 can be associated with permissions defining which users of the communication platform can view and/or edit the collaborative document 700. In some examples, the collaborative document 700 can be associated with a communication channel and at least some members of the communication channel can view and/or edit the collaborative document 700. In some examples, the collaborative document 700 can be sharable such that data associated with the collaborative document 700 is accessible to and/or interactable for users of the multiple communication channels, workspaces, organizations, and/or the like.

Figure 8:
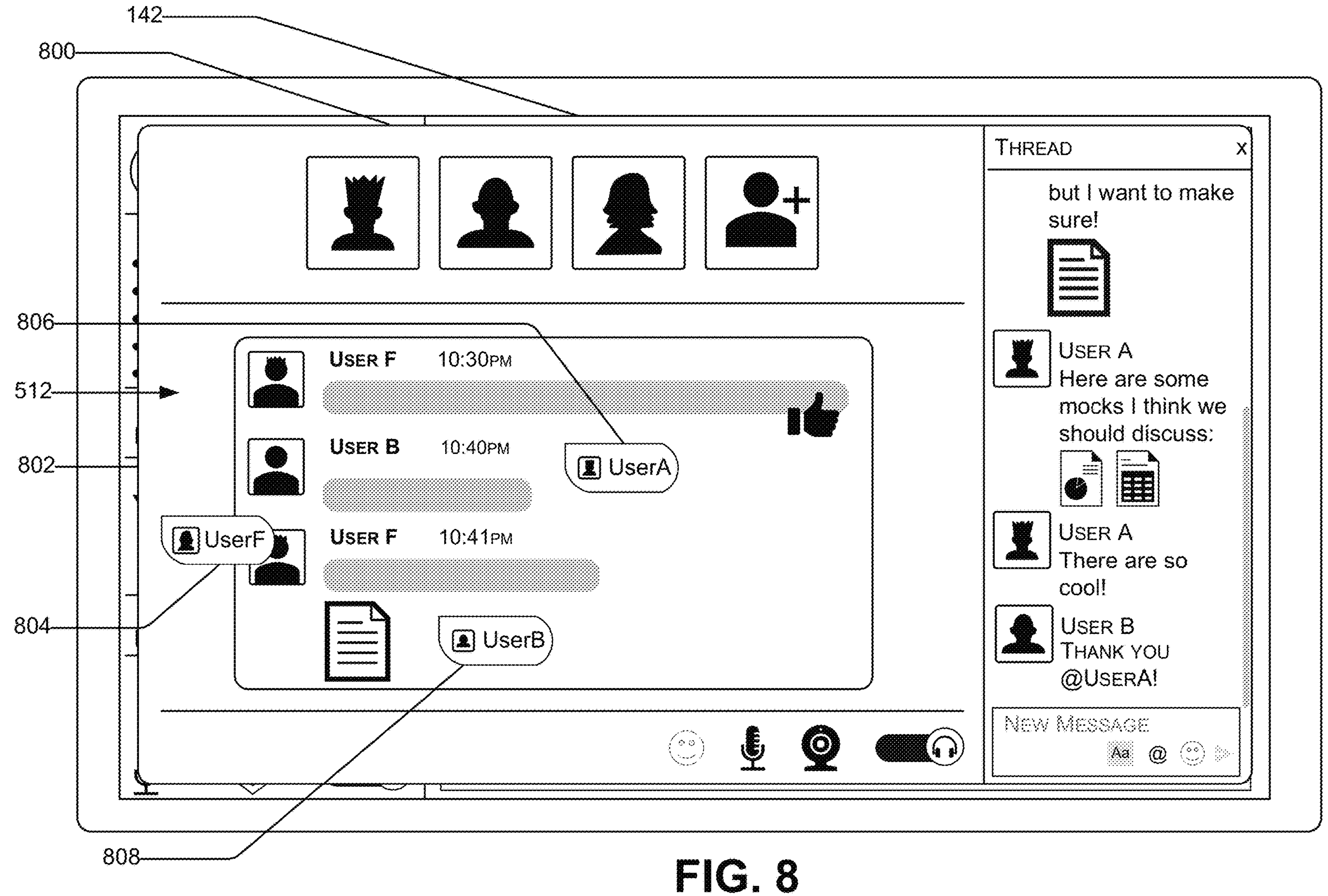
FIG. 8 illustrates an example user interface showing a collaborative document being generated in association with a virtual document, as described herein.

FIG. 8 illustrates an example user interface 142 showing a collaborative document 800 being generated in response to a virtual meeting being scheduled. In some examples, FIG. 8 illustrates the collaborative document 500 of FIG. 5 with content being presented in the second area 512. For example, from the collaborative document 500 illustrated in FIG. 5, one of the users may share their screen. In response, the second area 512 is updated to display a second area 512.

In some examples, the second area 512 is associated with a shared screen or content that is being presented by a first user, such as User F. The collaborative document 800 may illustrate a position of a first cursor of the first user, via a first indication 802. The first indication 802, as shown, is displayed in conjunction with a location of the first cursor within the content. The second area 512 further includes a second indication 804 associated with a position of a second cursor of a second user, as well as a third indication 806 associated with a position of a third cursor of a third user. The second indication 804 and the third indication 806, as shown, are displayed in conjunction with a location of the first cursor and the second cursor within the content.

In some examples, displaying the first indication 802, the second indication 804, and/or the third indication 806, allows users of the collaborative document 800 to understand a specific portion of the content being referenced or discussed by one another. For example, in the event that the first user is referencing a particular section or portion of the content, the second user and the third user may locate the first indication 802 for understanding the portion of the content that the first user is referring to. The same may be true for the second user and the third user, in that the first user is able to understand which portions of the content that the second user and the third user are referring to.

Although the second area 512 is shown displaying a single window, other windows, files, links, and so forth may be displayed in the second area 512 and the first indication 802, the second indication 804, and/or the third indication 806 may be displayed across the various windows, files, links, and so forth. For example, the first user may be presenting content within the second area 512, and the first indication 802 may reference a location of the cursor within the second area 512, while the second user may be observing a file. Here, the file may be presented within the second area 512 (e.g., a portion thereof), and the second indication 804 may indicate a location of the cursor within the file. In some examples, the users may initially have to opt-in or give permission that their cursors are respectively tracked.

In some examples, the collaborative document 800 may be generated for a real-time virtual meeting that allows users to share files and screens that come alive with cursor tracking, drawing, and a sense of presence. The collaborative document 800 further allows for users to turn videos on/off when desired (or when useful). When the virtual meeting is over, the collaborative document 800 persists so that the users do not lose the discussion, files, or links shared. However, although discussed herein with regard to synchronous meetings, the techniques herein may be extended to asynchronous meetings that are held over a defined period of time and where the users do not necessarily communicate in real-time.

Figure 9:
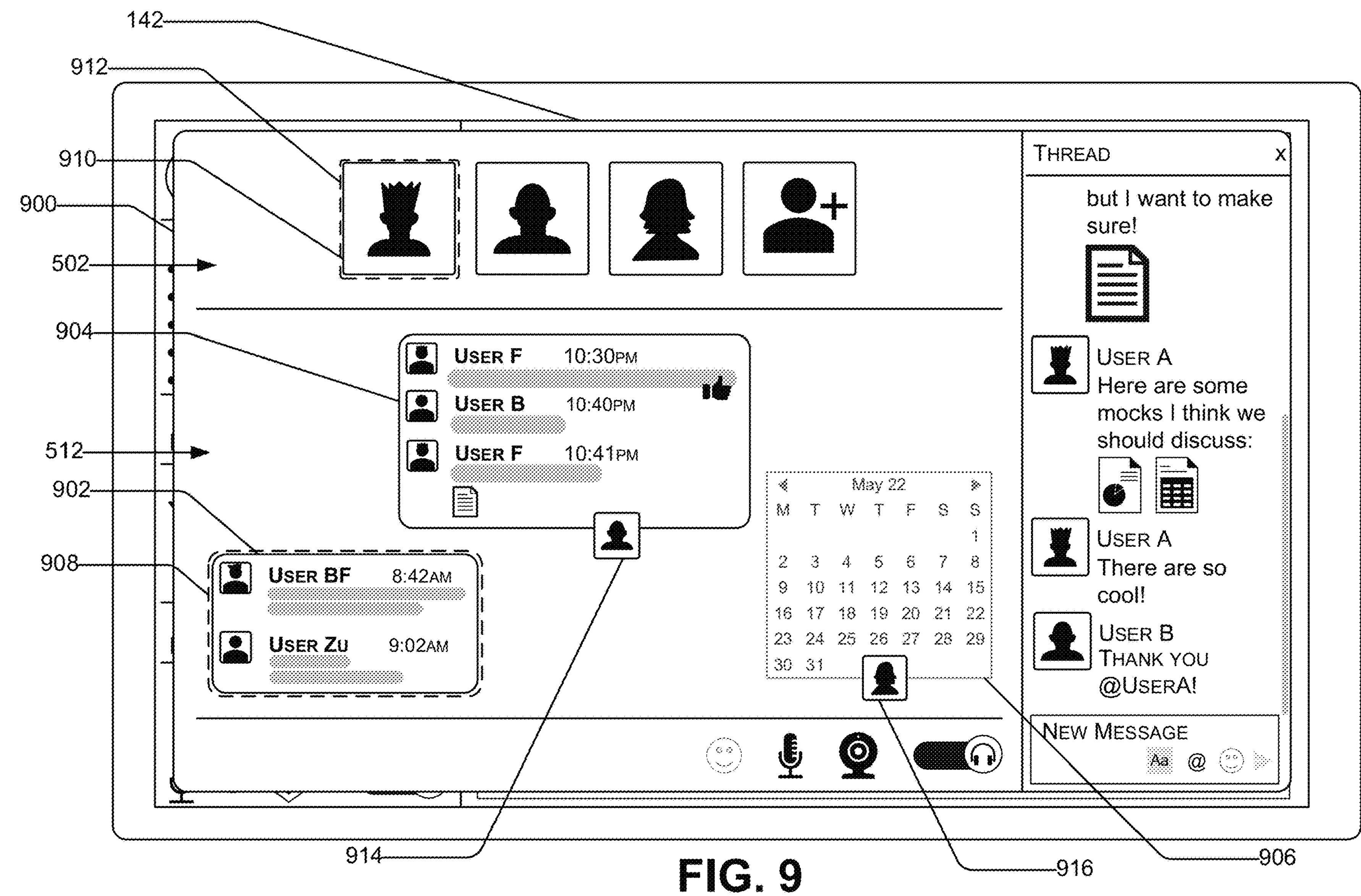
FIG. 9 illustrates an example user interface showing a collaborative document being generated in association with a virtual document, as described herein.

FIG. 9 illustrates an example user interface 142 showing a collaborative document 900 being generated in response to a virtual meeting being scheduled. In some examples, FIG. 9 illustrates the collaborative document of FIG. 5 with content being presented in the second area 512.

The second area 512 is shown including different content, such as first content 902, second content 904, and third content 906. In some examples, each of the first content 902, the second content 904, and the third content 906 are presented in separate windows within the second area 512. Additionally, in some examples, each of the first content 902, the second content 904, and the third content 906 may be associated with different documents, files, links that are included in the collaborative document 900. In other examples, the first content 902, the second content 904, and the third content 906 may be associated with documents, files, links, and so forth that are being viewed by the users. In this sense, those documents, files, links, and so forth that are currently being viewed by the users may be populated within the second area 512. As the users switch to viewing other content, the second area 512 may be updated to indicate such. In other examples, the content may be presented from a single user, and the other users may have the opportunity to move between the content and view the different content.

The first content 902 is shown being displayed in conjunction with a first indicia 908. In some examples, the first indicia 908 may highlight, outline, or otherwise signify the first content 902 among the other windows. The first indicia 908 may serve to indicate the content that a user is presenting (e.g., UserA), such as the first content 902. As additionally illustrated, in the first area 502, an icon 910 of the user (e.g., UserA) may include a second indicia 912 that matches or is otherwise associated with the first indicia 908. In this sense, the first indicia 908 and the second indicia 912 may be the same. For example, if the first indicia 908 includes a blue highlighted border around the first content 902, the second indicia 912 may include a blue highlighted border around the icon 910. As noted above, the icon 910 of the user may include an image or video stream of the user. By associating the first indicia 908 and the second indicia 912, other users within the collaborative document 900 are able to visually identify the content being presented, shared, or otherwise referenced by the user. The first indicia 908 and the second indicia 912 may be customizable by the users. Additionally, in examples where multiple users are presenting content, different pairs of the indicia may be used to signify the content being presented by the users, respectively. For example, if another user is additionally presenting content, another set of indicia (e.g., pink outline with dashed lines) may be signified around content within the second area 512.

In some examples, indications of what content the users are viewing may also be indicated. For example, a first indication 914 of a second user is shown being presented in conjunction with the second content 904. The first indication 914 may include a representation of the second user, and indicate to other users with the collaborative document 900 that the second user is observing the second content 904. Additionally, a second indication 916 is shown being presented in association with the third content 906, to indicate to other users with the collaborative document 900 that the third user is observing the third content 906. Of course, in examples where the collaborative document 900 includes additional users, additional indications may be presented. In some examples, the first indication 914 and/or the second indication 916 may include face piles of the users, respectively.

In some examples, the content within the second area 512 may be reordered and/or otherwise rearranged by the users, respectively. In such examples, the second area 512, or the content displayed in the second area 512, may be modified such that the users can customize and/or personalize the collaborative document 900 to serve their individual needs. Although the collaborative document 900 is shown including certain content, the collaborative document 900 may support the integration of other applications (via APIs), other forms of collaboration, including drawings, cursor tracking, jamboards (e.g., digital whiteboards), etc.

Figure 10:
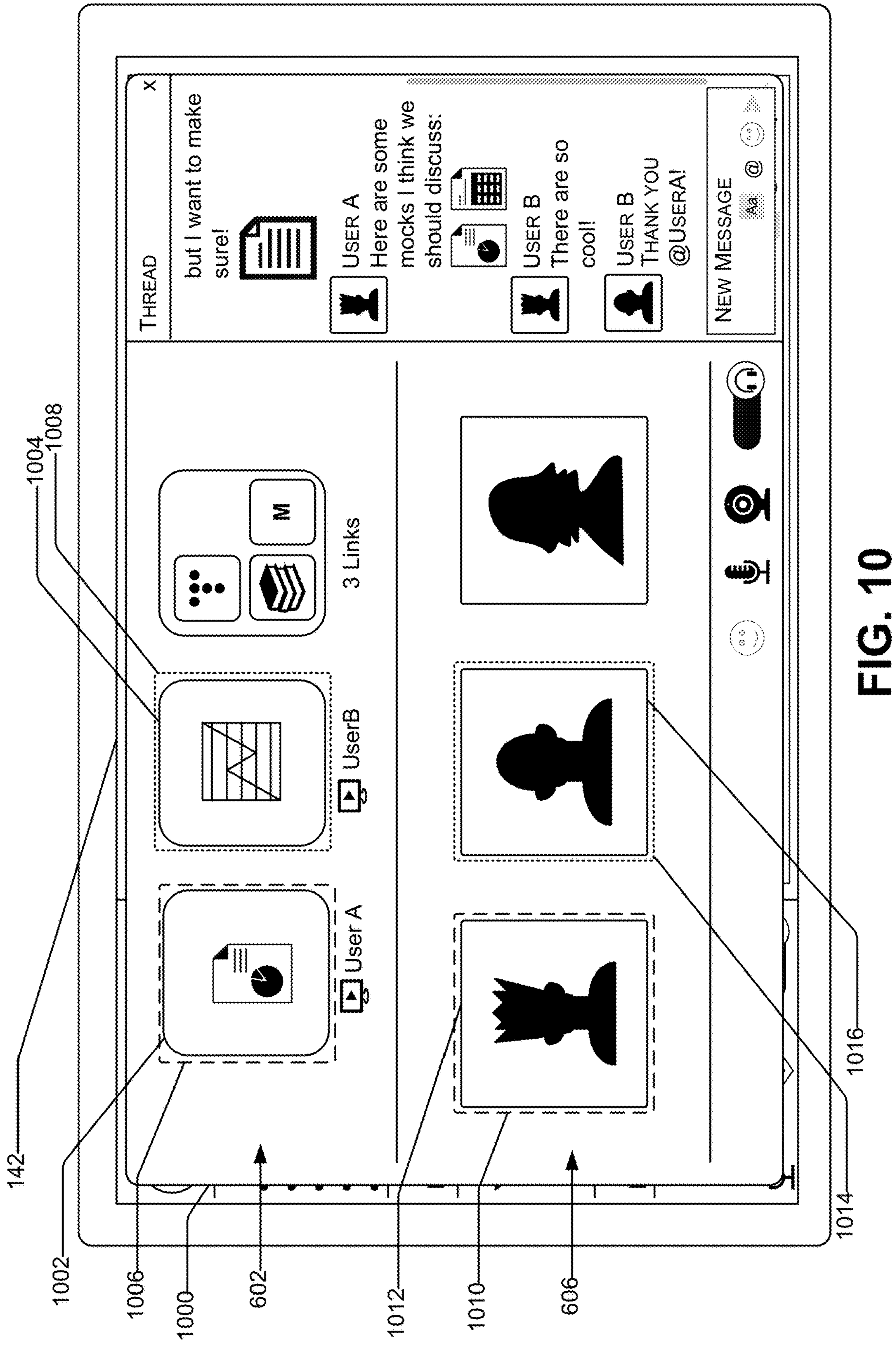
FIG. 10 illustrates an example user interface showing a collaborative document being generated in association with a virtual document, as described herein.

FIG. 10 illustrates an example user interface 142 showing a collaborative document 1000 being generated in response to a virtual meeting being scheduled. In some examples, the collaborative document 1000 of FIG. 10 may be similar to the collaborative document 600 of FIG. 6.

The first area 602 is shown including first content 1002 being presented by a first user (e.g., UserA) and second content 1004 being presented by a second user (e.g., UserB). The first content 1002 and the second content 1004 may include first indicia 1006 and second indicia 1008, respectively, to associate the first content 1002 and the second content 1004 with the first user and the second user. For example, within the first area 602, the first content 1002 includes the first indicia 1006 that is similar to third indicia 1010 around a first icon 1012 of the first user in the second area 606. Similarly, within the first area 602, the second content 1004 includes the second indicia 1008 that is similar to fourth indicia 1014 around a second icon 1016 of the second user in the second area 606.

From the view shown in FIG. 10, users may select which content they wish to view, or have presented within the second area 606 of the collaborative document 1000. For example, if a third user (e.g., UserF) desires to view the first content 1002, the third user may select the first content 1002 within the first area 602 (or an affordance thereof). In response, the second area 606 of the collaborative document 1000 may be updated to display the second content 1004 to the third user.

The multi-share screen illustrated in the collaborative document 1000 provides an archive of links and conversations that are tracked and recorded. For example, within the virtual meeting, users may share their respective screens, upload links, and otherwise share content. This content is stored within the collaborative document 1000 for use and/or viewing at a later instance. In other words, the communications and content that is presented within the collaborative document 1000 is recorded, and the collaborative document may be accessed at later times.

Figure 11:
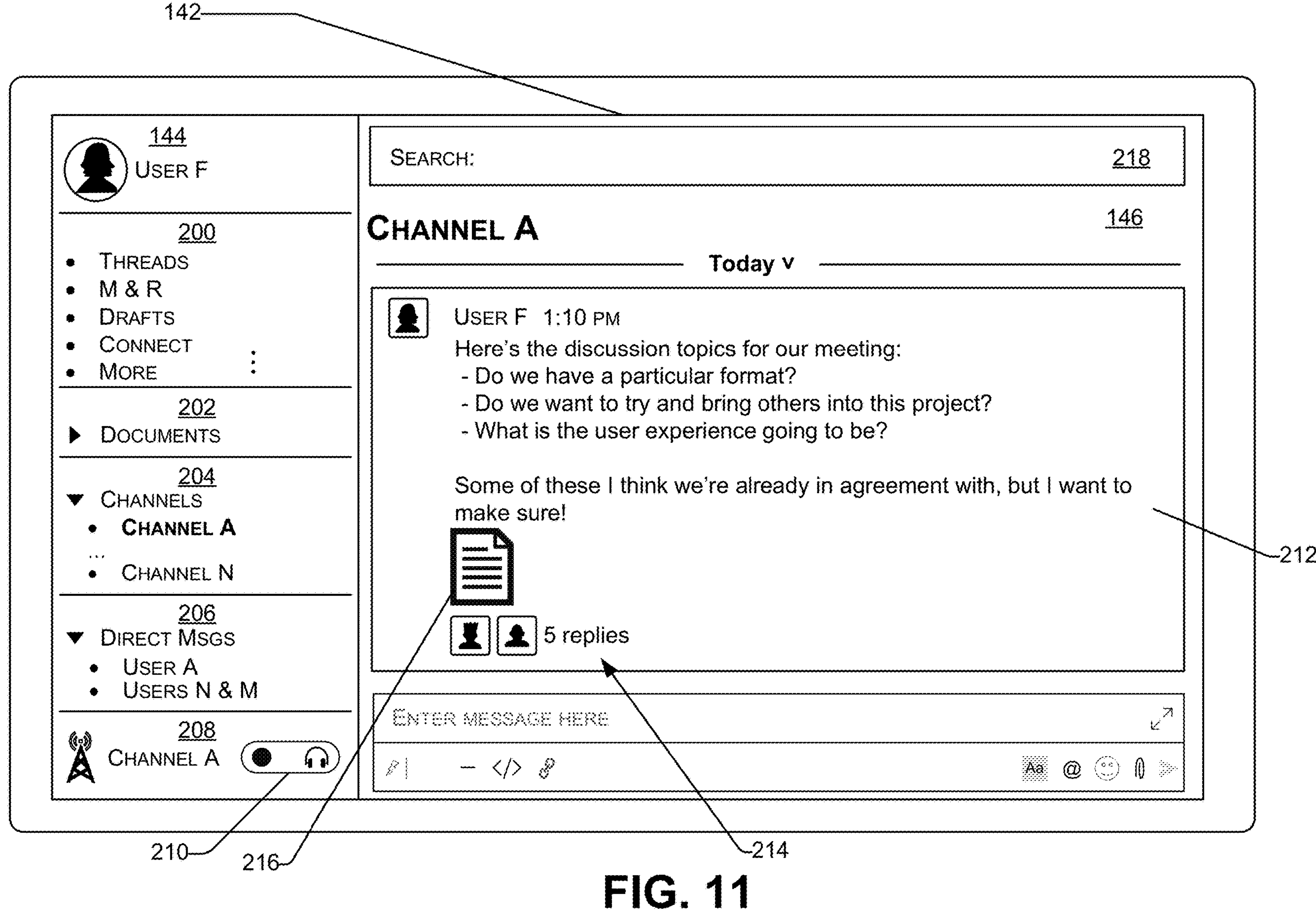
FIG. 11 illustrates an example user interface showing a collaborative document being associated with a message in a communication channel, as described herein.

FIG. 11 illustrates an example user interface 142 following a termination, or closure, of a collaborative document. As illustrated, the communication channel is being shown. However, the communication channel may be updated based on the communications that took place within the collaborative document. For example, the indication 214 is shown including five replies, as compared to the previous three replies (as shown in FIG. 2). That is, returning briefly to the collaborative document of FIG. 7, for example, in which users posted messages to a thread of the collaborative document, these messages may be indicated within the communication channel, and in association with the object around which the collaborative document was created. In other words, because the collaborative document was created around the message, the communications within the thread (or more generally, the collaborative document), may be embedded back into the communication channel and associated with the message. This archives the communications with the collaborative document. By grouping the replies, the discussion associated with the virtual meeting and/or the collaborative document can be maintained in association with an object (e.g., a message in the communication channel) so that users can easily follow discussion relevant to the virtual meeting and can have access to content to understand the discussion associated with the virtual meeting (e.g., without getting distracted by other happenings in the communication channel).

Additionally, in some examples, an indication of the virtual meeting and/or the collaborative document may be presented in the communication channel to indicate that the virtual meeting took place. In some examples, users may select on the indication 214 to open the thread and/or to view the collaborative document. For example, in at least one example, a message representative of a virtual meeting can be posted to the communication channel.

As further shown, the affordance 148 is not displayed in conjunction with the message. However, if a cursor of the user hovers over a particular area of the message (e.g., upper right-hand corner), the affordance 148 may be displayed. Additionally, the affordance 210 within the fifth sub-section 208 is shown being toggled off to indicate that the virtual meeting is not taking place. Still, if the user hovers over the indication 214, a virtual meeting pop-up may be displayed and which allows the user to open the collaborative document.

Figure 13:
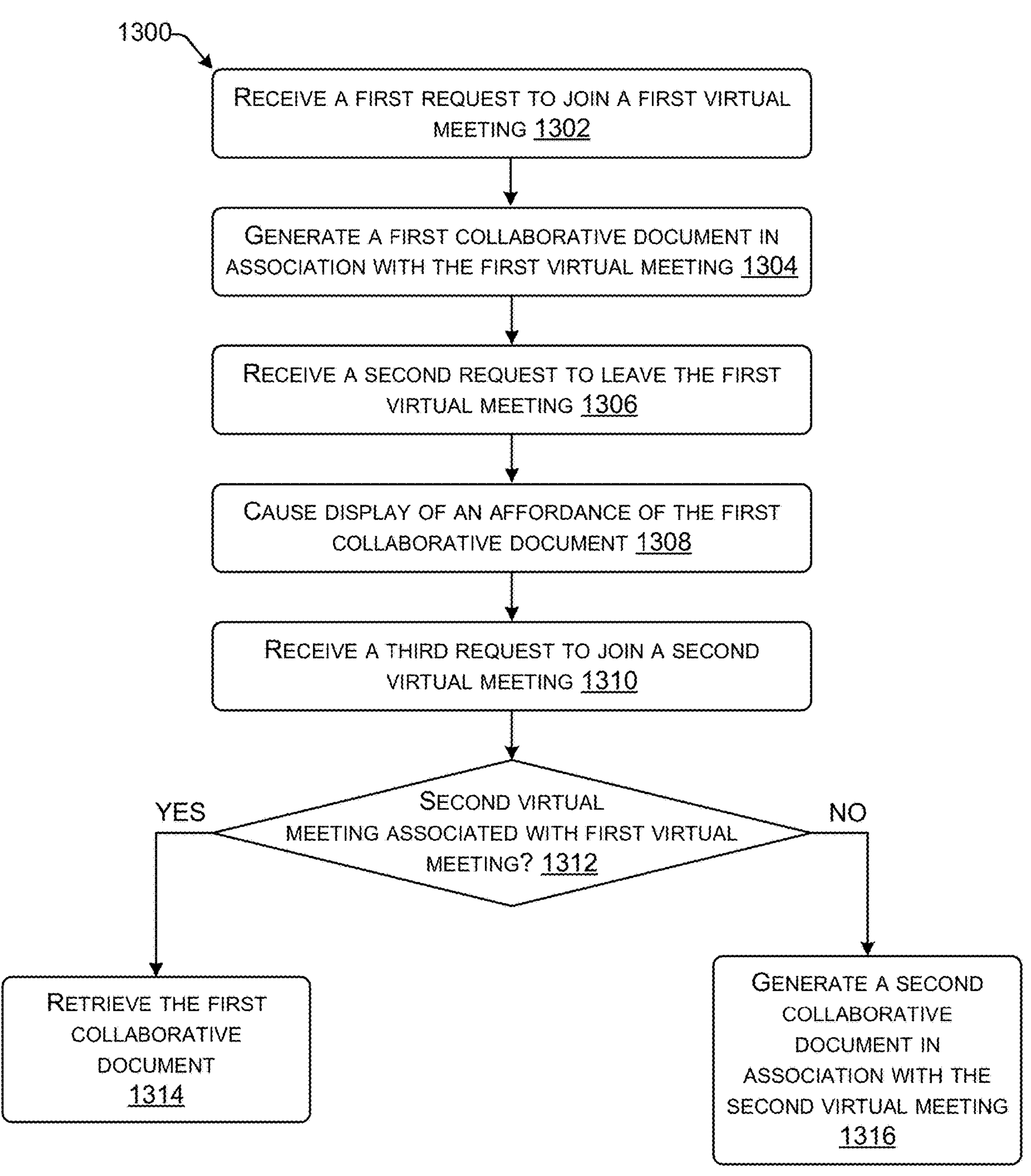
FIG. 13 illustrates an example process for retrieving a collaborative document, as described herein.

FIGS. 12 and 13 illustrate processes for generating a collaborative document in association with a virtual meeting. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-11, although the processes may be implemented in a wide variety of other environments, architectures and systems.

At 1202, the process 1200 may include receiving a request to generate a virtual meeting associated with an object. In an example, the object may include a text document, an image, a video, a message, or any other file or data item. For example, a first user may request a virtual meeting in association with a message within a communication channel in which the first user and one or more additional users are communicating. In some examples, the request may be received independent of the communication channel, independent of the object. However, for this example, the first user may request the virtual meeting with one or more additional users to discuss the object, or to otherwise collaborate around the object.

At 1204, the process 1200 may include determining data associated with the object. For example, within the communication channel, the users may have posted links, uploaded documents, or communicated messages about the object. The data is used to determine, or understand, a context of the virtual meeting as well as to generate a collaborative document in association with the virtual meeting. For example, the data may be presented within the collaborative document to allow users to engage with the files, links, documents, and so forth.

At 1206, the process 1200 may include generating a collaborative document in association with the virtual meeting that includes the data. For example, the collaborative document enables messaging and sharing functionalities attributable to a virtual space. In some examples, the collaborative document can be a virtual space, a board, a canvas, a page, or the like for collaborative communication and/or data organization within the communication platform. That is, the collaborative document can be treated as, and include the functionalities associated with, a virtual space, such as a communication channel. As such, within the collaborative document, the users may communicate, exchange messages, share content, and so forth. Using the data, the collaborative document may be populated with, or otherwise indicate, communications previously exchanged within the communication channel and which are associated with the object. For example, the links, documents, videos, content, and so forth that occurred within the communication channel, in association with the object, may be indicated within the collaborative document as a way to provide context to the virtual meeting. In doing so, within the collaborative document, the users may engage in audio and/or video communications, as well as share links, documents, screens (i.e., screen-sharing), and the like.

In at least one example, the collaborative document can support editable text and/or objects that can be ordered, added, deleted, modified, and the like. The collaborative document may support various elements, such as, but not limited to, text, symbols, emojis, images, videos, audio, charts, tables, lists, calendar items, spreadsheets, drawings, etc.

At 1208, the process 1200 may include causing display of the collaborative document in association with the virtual meeting. For example, on user interfaces, the collaborative document may be displayed such that the users may engage in audio and/or video communications, as well as share links, documents, chat, share screens (i.e., screen-sharing), and the like. In some examples, the collaborative document may include a thread that allows the users to post messages to one another, upload links, share files, share screens, and so forth. Additionally, noted above, the collaborative document may be populated or otherwise indicate the files, documents, links, etc. that were associated with the object. The users may also have the ability to disable audio and/or video depending on personal preferences.

At 1210, the process 1200 may include determining one or more users associated with the virtual meeting and/or the collaborative document. In some examples, the one or more users may be determined based at least in part on a context around which the collaborative document was created, such as those users that were members of the communication channel. In other examples, a user requesting the virtual meeting may manually enter usernames (or other identifiers) of the users that are to be invited to the virtual meeting.

At 1212, the process 1200 may include sending an invite to the one or more users associated with the virtual meeting. For example, based on identifying the one or more users, the communication platform may send invites to those users. In some examples, the invite may include the data associated with the collaborative document to indicate to the users the context of the virtual meeting. As an example, if the virtual meeting is being created in association with the object, the invite may indicate that the virtual meeting is being scheduled to discuss the object.

At 1214, the process 1200 may include receiving input via the collaborative document. The input may generally represent actions within the collaborative document, such as when content is being shared, messages that are communicated within the collaborative document, links that are posted to the collaborative document, applications that are accessed, who is presenting/sharing content, and so forth. In other words, the collaborative document that is created in association with the virtual meeting may track and record what is occurring within the virtual meeting. This allows, in part, a record of the virtual meeting to be created and archived for later use and access. As such, as users engage in audio and/or video communications, as well as share links, documents, screens (i.e., screen-sharing), and the like, such inputs may be received and recorded.

Additionally, when a user is interacting with the collaborative document, the users may benefit from updates indicating whether other users are also interacting with the collaborative document at the same time. For example, in a collaborative context, a user may want to be able to quickly determine which other users are currently interacting with the collaborative document. In addition, users may desire to know which content, files, links, and so forth of the collaborative document that others are interacting with. The collaborative document may include presence indicators that indicate to a user when another user is interacting with the collaborative document.

At 1216, the process 1200 may include updating the collaborative document based at least in part on the input. For example, the links, files, and other content (e.g., share screen) that are presented within the collaborative document are archived for later use. As such, when the virtual meeting is over, the collaborative document still persists so that the users do not lose the discussion, files, or links shared in the virtual meeting.

At 1218, the process 1200 may include causing display of an affordance of the collaborative document in association with the object. In this manner, the collaborative document is stored and archived for later use and/or reference after the virtual meeting has terminated. Using the affordance, the collaborative document is intended to be a collaborative space to share and discuss content in real-time, and afterwards, the collaborative document may be reopened and edited by anyone with access. In some examples, the collaborative document may be used within synchronous or asynchronous work. For example, the collaborative document may be generated independent of the virtual meeting.

The collaborative document is configured to be accessed and/or edited by two or more users with appropriate permissions (e.g., viewing permissions, editing permissions, etc.). In some examples, the collaborative document can be associated with permissions defining which users of a communication platform can view and/or edit the collaborative document. In some examples, the collaborative document can be associated with a communication channel, and permissions may be based on channel membership, such that members of the communication channel can view and/or edit the document. In some examples, the collaborative document can be sharable (e.g., via a link or other address indication), such that data associated with the document is accessible to and/or interactable for members of the multiple communication channels, workspaces, organizations, and/or the like. For example, the collaborative document can be associated with a user, channel, or other virtual space and can be shared with users that are not members by sharing a link to the document.

In at least one example, in response to receiving an indication of selection of the affordance, the communication platform may cause the collaborative document to be presented via the user interface (or within a portion thereof).

As introduced above, the collaborative document may be created in association with certain permissions. For example, users of the collaborative document may be granted access permissions to the collaborative document based in part on a user or organizational preference associated with the creating user of the collaborative document. In such examples, the permission settings associated with the collaborative document may be stored in association with the user account(s) of the user(s) or member(s) of the collaborative document. In at least one example, the permission setting can include full editing permissions associated with the collaborative document. In such an example, users of the collaborative document may be granted permission to contribute to and/or edit or otherwise modify the collaborative document. In other examples, the permission setting can include limited editing permission settings, such as permissions to add content but not delete content, permissions to comment but not modify text in the collaborative document, read-only permissions, and/or the like.

Additionally or alternatively, in some examples, the permissions setting may include a setting associated with sharing data within the collaborative document. In some examples, the data may include content posted or otherwise made available via other virtual spaces that are not associated with the collaborative document. That is, users may be permitted or restricted, based on sharing permissions, to share data (e.g., messages, files, etc.) posted or otherwise made available via an unrelated virtual space within the collaborative document. In some examples, the data may be presented in the collaborative document as an object including an indicator of the virtual space, an identifier associated with a sending user, and other data. In various examples, the data may be presented as a read-only object, such that the data may not be manipulated within the collaborative document. In some examples, the data as an object, similar to other objects presented in association with the collaborative document, may be configured to serve as a root of a thread of messages. In such examples, while members of the collaborative document may not have permissions to modify the data, the members may be able to discuss and otherwise comment on the data in a messaging thread associated therewith.

Additionally, in various examples, the permissions settings may include permissions to share the collaborative document and/or a portion thereof with one or more additional users. In various examples, a permissions setting may include full sharing permissions (e.g., share the collaborative document or a portion thereof with read and write capabilities), limited sharing permissions (e.g., share read-only copies of the collaborative document or a portion thereof), no sharing permissions (e.g., user not permitted to share the collaborative document with non-members). In at least one example, the permission setting associated with sharing the collaborative document can designate whether a particular user can add another user as a member of the collaborative document. In some examples, the permission setting associated with sharing the collaborative document can be based on an organizational affiliation with the requesting user and the additional user(s). For example, the permission setting can enable members to share a collaborative document with other users of a first organization, but not with users that are associated with other organizations. For another example, the permission setting can enable members to share a collaborative document with full editing permissions with members of the first organization and read-only copies of the collaborative document with members of a second organization. As such, the communication platform can enable the data presented in the collaborative document to be shared, but not modified by members of the second organization, such as to maintain integrity of the data. In some examples, the permission to share the collaborative document and/or add additional user(s) thereto can be designated by the creating user, expressly as a designated user preference and/or organization preference associated with an organization of the creating user or as a default setting associated with the communication platform.

FIG. 13 illustrates an example process 1300 for retrieving previous generated collaborative documents. At 1302, the process 1300 may include receiving a first request to join a first virtual meeting. For example, a user may request a virtual meeting to collaborate around an object, and to virtually meet with other users within a communication channel (or on a communication platform). In some examples, the virtual meeting may include text-based, audio-based, and/or video-based communication.

At 1304, the process 1300 may include generating a first collaborative document in association with the first virtual meeting. In some examples, the first collaborative document is generated based on links, uploaded documents, or communicated messages about an object within the communication channel. As discussed herein, the collaborative document enables messaging and sharing functionalities attributable to a virtual space, a board, a canvas, a page, or the like for collaborative communication and/or data organization within the communication platform. The collaborative document may be populated with, or otherwise indicate, communications previously exchanged within the communication channel and which are associated with the object. For example, the links, documents, videos, content, and so forth that occurred within the communication channel, in association with the object, may be indicated within the collaborative document as a way to provide context to the virtual meeting.

At 1306, the process 1300 may include receiving a second request to leave the first virtual meeting. For example, the user may close out of the collaborative document. At 1308, the process 1300 may include causing display of an affordance of the collaborative document in association. In this example, the collaborative document is stored and archived for later use and/or reference after the virtual meeting has terminated. Using the affordance, the collaborative document is intended to be a collaborative space to share and discuss content in real-time, and afterwards, the collaborative document may be reopened and edited by anyone with access.

At 1310, the process 1300 may include receiving a third request to join a second virtual meeting. For example, a user may request a virtual meeting to collaborate around an object, and to virtually meet with other users within a communication channel (or on a communication platform). In some examples, the virtual meeting may include text-based, audio-based, and/or video-based communication.

At 1312, the process 1300 may include determining whether the second virtual meeting is associated with the first virtual meeting. For example, whether the first virtual meeting and the second virtual meeting are associated may be based on the users scheduling meetings to discuss the same object, whether the users invited to the first virtual meeting and the second virtual meeting are the same, whether the third request includes an identifier that the first virtual meeting and the second virtual meeting are similar (e.g., identifiers), and so forth. In other examples, the third request may be received in association with the affordance of the collaborative document. That is, by selecting the affordance of the collaborative document, the second virtual meeting may be a continuation or associated with the first virtual meeting.

If at 1312 the process 1300 determines that the first virtual meeting and the second virtual meeting are associated, the process 1300 may follow the "YES" route and proceed to 1314. At 1314, the process 1300 may include retrieving the first collaborative document and causing display of the first collaborative document. As such, the process 1300 illustrates a scenario in which the collaborative document is stored and archived for later use and/or reference after the virtual meeting has terminated. That is, when the virtual meeting is over, the collaborative document still persists so that the users do not lose the discussion, files, or links shared in the virtual meeting. At a later instance in time, another virtual meeting around the same object may take place and, in such instances, the collaborative document is accessed.

If at 1312 the process 1300 determines that the first virtual meeting and the second virtual meeting are not associated, the process may follow the "NO" route and proceed to 1316 and generate a second collaborative document in association with the second virtual meeting.

EXAMPLE CLAUSES

A: A method, implemented at least in part by one or more computing devices of a group-based communication platform, the method comprising: receiving a first request to create a virtual meeting, the virtual meeting associated with a virtual space of a communication system and a first user account of a first user, the virtual meeting having at least one of an audio or video capability; receiving a second request to create a document associated with the virtual meeting; identifying one or more objects in the virtual space, wherein the one or more objects are associated with one or more users of the virtual space; generating the document based at least in part on the second request and the one or more objects; causing display of the document in a user interface of the communication system; detecting a selection of an object of the one or more objects in the user interface; and in response to detecting the selection of the object, causing display of the object in the document.

B: The method of paragraph A, wherein causing display of the document comprises: causing display of a first indication of the object; and causing display of a second indication of a second object of the one or more objects.

C: The method of paragraph A or B, wherein causing display of the document comprises: causing display of one or more icons within a first area of the document, individual icons of the one or more icons being associated with individual objects of the one or more objects; and causing display of content associated with the one or more objects within a second area of the document.

D: The method of any of paragraphs A-C, wherein the document further includes a message thread, the message thread being populated with communications within the virtual space of the communication system.

E: The method of any of paragraphs A-D, further comprising: receiving a second request to associate the document with a second user account of a second user that is different than the first user; in response to receiving the second request, associating the document with the second user account; and in response to associating the document with the second user account, causing display of an identifier associated with the virtual meeting in a second user interface associated with the second user account.

F: The method of any of paragraphs A-E, wherein the virtual space comprises a communication channel.

G: The method of any of paragraphs A-F, further comprising: receiving an interaction associated with the first user in the virtual space; and presenting, based on an interaction, an affordance, wherein a selection of the affordance is associated with receiving the first request to create the virtual meeting.

H: The method of any of paragraphs A-G, further comprising determining one or more permissions associated with the document, the one or more permissions including at least one of editing abilities of the document or a publicity of the document.

I: The method of any of paragraphs A-H, wherein the object comprises at least one of: a task; a ticket; a document; a calendar event; or a message transmitted via the communication system and shared in association with the document.

J: A system, implemented at least in part by one or more computing devices of a group-based communication platform, the system comprising: one or more processors; and one or more non-transitory computer-readable media storing instructions that, when executed, cause the system to perform operations comprising: receiving a first request to create a virtual meeting, the virtual meeting associated with a virtual space of a communication system and a first user account of a first user, the virtual meeting having at least one of an audio or video capability; receiving a second request to create a document associated with the virtual meeting; identifying one or more objects in the virtual space, wherein the one or more objects are associated with one or more users of the virtual space; generating the document based at least in part on the second request and the one or more objects; causing display of the document in a user interface of the communication system; detecting a selection of an object of the one or more objects in the user interface; and in response to detecting the selection of the object, causing display of the object in the document.

K: The system of paragraph J, wherein causing display of the document comprises: causing display of a first indication of the object; and causing display of a second indication of a second object of the one or more objects.

L: The system of paragraph J or K, wherein causing display of the document comprises: causing display of one or more icons within a first area of the document, individual icons of the one or more icons being associated with individual objects of the one or more objects; and causing display of content associated with the one or more objects within a second area of the document.

M: The system of any of paragraphs J-L, wherein the document further includes a message thread, the message thread being populated with communications within the virtual space of the communication system.

N: The system of any of paragraphs J-M, the operations further comprising: receiving a second request to associate the document with a second user account of a second user that is different than the first user; in response to receiving the second request, associating the document with the second user account; and in response to associating the document with the second user account, causing display of an identifier associated with the virtual meeting in a second user interface associated with the second user account.

P: The system of any of paragraphs J-N, the operations further comprising: receiving an interaction associated with the first user in the virtual space; and presenting, based on an interaction, an affordance, wherein a selection of the affordance is associated with receiving the first request to create the virtual meeting.

Q: The system of any of paragraphs J-P, the operations further comprising determining one or more permissions associated with the document, the one or more permissions including at least one of editing abilities of the document or a publicity of the document.

R: One or more non-transitory computer-readable media storing instructions that, when executed, cause one or more processors to perform operations comprising: receiving a first request to create a virtual meeting, the virtual meeting associated with a virtual space of a communication system and a first user account of a first user, the virtual meeting having at least one of an audio or video capability; receiving a second request to create a document associated with the virtual meeting; identifying one or more objects in the virtual space, wherein the one or more objects are associated with one or more users of the virtual space; generating the document based at least in part on the second request and the one or more objects; causing display of the document in a user interface of the communication system; detecting a selection of an object of the one or more objects in the user interface; and in response to detecting the selection of the object, causing display of the object in the document.

S: The one or more non-transitory computer-readable media of paragraph R, wherein the document further includes a message thread, the message thread being populated with communications within the virtual space of the communication system.

T: The one or more non-transitory computer-readable media of paragraph R or S, the operations further comprising: receiving a second request to associate the document with a second user account of a second user that is different than the first user; in response to receiving the second request, associating the document with the second user account; and in response to associating the document with the second user account, causing display of an identifier associated with the virtual meeting in a second user interface associated with the second user account.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method, implemented at least in part by one or more computing devices of a communication system, the method comprising:

receiving a request to create a virtual meeting around a communication shared within a first message thread of a virtual space, wherein the communication is a root object of the first message thread;

determining, by the communication system, contextual data associated with the communication, the contextual data indicating at least a topic to be discussed during the virtual meeting, wherein determining the contextual data comprises analyzing the first message thread to identify thread-specific data associated with the root object;

identifying, by the communication system and based at least in part on the contextual data, one or more objects previously shared in the virtual space, wherein the one or more objects are associated with one or more users of the virtual space, wherein the one or more objects are specifically related to the root object as determined from the contextual data;

generating a document based at least in part on the request to create the virtual meeting, wherein the document is associated with a second message thread that is pre-populated with the root object and the one or more objects previously shared in the virtual space, wherein the document is a collaborative document that is accessible to members of the virtual space from within the virtual space, and wherein the second message thread is a distinct data structure from the first message thread;

automatically populating the document with data that is specifically related to the virtual meeting and that was previously included within the virtual space, wherein the data includes communications previously exchanged within the virtual space and objects related to the virtual meeting, wherein functionalities of the virtual space are imbued in the document such that the document facilitates interactions between participants of the virtual meeting during the virtual meeting, wherein the functionalities imbued in the document include at least messaging functionality, file sharing functionality, and presence-indication functionality that collectively enable the document to operate as a different virtual space;

receiving an indication to initiate the virtual meeting;

in response to receiving the indication to initiate the virtual meeting, causing display of the document in a user interface of the communication system, the document comprising the root object, the one or more objects previously shared in the virtual space, and the data;

receiving, during the virtual meeting and within the second message thread, a plurality of communications, wherein a portion of the plurality of communications comprise one or more replies to the root object;

identifying metadata associated with the portion of the plurality of communications, wherein the metadata includes at least a sending user identifier, a message identifier, and a timestamp associated with the portion of the plurality of communications; and embedding, after the virtual meeting has been terminated, the metadata associated with the portion of the plurality of communications with the root object such that the one or more replies to the root object received during the virtual meeting persist within the first message thread, thereby updating the first message thread in the virtual space to reflect the plurality of communications that occurred within the second message thread of the document during the virtual meeting without requiring separate user action to transfer the plurality of communications.

2. The method of claim 1, wherein causing display of the document comprises:

causing display of a first indication of the root object; and causing display of a second indication of a second object of the one or more objects.

3. The method of claim 1, wherein causing display of the document comprises:

causing display of one or more icons within a first area of the document, individual icons of the one or more icons being associated with individual objects of the one or more objects; and causing display of content associated with the one or more objects within a second area of the document.

4. The method of claim 1, wherein the document is associated with a first user account of a first user, the method further comprising:

receiving a second request to associate the document with a second user account of a second user that is different than the first user;

in response to receiving the second request, associating the document with the second user account; and in response to associating the document with the second user account, causing display of an identifier associated with the virtual meeting in a second user interface associated with the second user account.

5. The method of claim 1, further comprising determining one or more permissions associated with the document, the one or more permissions including at least one of editing abilities of the document or a publicity of the document.

6. The method of claim 1, wherein receiving the request to create the virtual meeting around the communication comprises receiving a second indication of a selection of an affordance associated with the communication.

7. The method of claim 1, wherein the virtual meeting is a first virtual meeting, the method further comprising:

receiving a second request to terminate the first virtual meeting;

in response to receiving the second request to terminate the first virtual meeting, storing the document in association with the communication shared within the virtual space;

receiving a second indication to create a second virtual meeting around the communication shared within the first message thread of the virtual space;

determining that the second virtual meeting is associated with the first virtual meeting based at least in part on the contextual data; and in response to determining the second virtual meeting is associated with the first virtual meeting, causing display of the document in association with the second virtual meeting.

8. The method of claim 1, the method further comprising:

receiving a second request to terminate the virtual meeting;

generating, based at least in part on receiving the second request to terminate the virtual meeting, an affordance associated with the document, wherein selection of the affordance causes the document to be presented via the user interface; and embedding the affordance associated with the document with the root object such that the affordance is presented in association with the communication.

9. The method of claim 1, wherein generating the document comprises generating a document identifier associated with the document, the document identifier configured to enable a messaging functionality and a sharing functionality within the document.

10. The method of claim 1, wherein the document enables multiple users to present content simultaneously within the document and during the virtual meeting, the method further comprising:

receiving, from a first user, a first request to present first content in a first area of the document;

causing the first content to be displayed in the first area of the document;

receiving, from a second user, a second request to present second content via a second area of the document; and causing the second content to be displayed via the second area of the document in addition to the first content.

11. The method of claim 1, wherein the virtual space is a first virtual space and generating the document comprises:

determining first permission data associated with the first virtual space; and generating second permission data associated with the document, the second permission data enabling the document to be shared to a second virtual space after the virtual meeting is terminated.

12. The method of claim 1, wherein automatically populating the document comprises:

generating a document identifier associated with the document that enables the communication system to treat the document as the different virtual space distinct from the virtual space of the first message thread;

associating the document identifier with the one or more objects identified based at least in part on the contextual data; and transmitting the one or more objects to the document in response to generating the document identifier, thereby reducing a number of separately-running application instances on a user computing device to access the one or more objects during the virtual meeting.

13. A system, implemented at least in part by one or more computing devices of a communication platform, the system comprising:

one or more processors; and one or more non-transitory computer-readable media storing instructions that, when executed, cause the system to perform operations comprising:

receiving a request to create a virtual meeting around a communication shared within a first message thread of a virtual space, wherein the communication is a root object of the first message thread;

determining contextual data associated with the communication, the contextual data indicating at least a topic to be discussed during the virtual meeting, wherein determining the contextual data comprises analyzing the first message thread to identify thread-specific data associated with the root object;

identifying, by the one or more computing devices of the communication platform and based at least in part on the contextual data, one or more objects previously shared in the virtual space, wherein the one or more objects are associated with one or more users of the virtual space, wherein the one or more objects are specifically related to the root object as determined from the contextual data;

generating a document based at least in part on the request to create the virtual meeting, wherein the document is associated with a second message thread that is prepopulated with the root object and the one or more objects previously shared in the virtual space, wherein the document is a collaborative document that is accessible to members of the virtual space from within the virtual space, and wherein the second message thread is a distinct data structure from the first message thread;

automatically populating the document with data that is specifically related to the virtual meeting and that was previously included within the virtual space, wherein the data includes communications previously exchanged within the virtual space and objects related to the virtual meeting, wherein functionalities of the virtual space are imbued in the document such that the document facilitates interactions between participants of the virtual meeting during the virtual meeting, wherein the functionalities imbued in the document include at least messaging functionality, file sharing functionality, and presence-indication functionality that collectively enable the document to operate as a different virtual space;

receiving an indication to initiate the virtual meeting;

in response to receiving the indication to initiate the virtual meeting, causing display of the document in a user interface of the communication platform, the document comprising the root object, the one or more objects previously shared in the virtual space, and the data;

receiving, during the virtual meeting and within the second message thread, a plurality of communications, wherein a portion of the plurality of communications comprise one or more replies to the root object;

identifying metadata associated with the portion of the plurality of communications, wherein the metadata includes at least a sending user identifier, a message identifier, and a timestamp associated with the portion of the plurality of communications; and embedding, after the virtual meeting has been terminated, the metadata associated with the portion of the plurality of communications with the root object such that the one or more replies to the root object received during the virtual meeting persist within the first message thread, thereby updating the first message thread in the virtual space to reflect the plurality of communications that occurred within the second message thread of the document during the virtual meeting without requiring separate user action to transfer the plurality of communications.

14. The system of claim 13, wherein causing display of the document comprises:

causing display of a first indication of the root object; and causing display of a second indication of a second object of the one or more objects.

15. The system of claim 13, wherein causing display of the document comprises:

causing display of one or more icons within a first area of the document, individual icons of the one or more icons being associated with individual objects of the one or more objects; and causing display of content associated with the one or more objects within a second area of the document.

16. The system of claim 13, wherein the document is associated with a first user account of a first user, the operations further comprising:

receiving a second request to associate the document with a second user account of a second user that is different than the first user;

in response to receiving the second request, associating the document with the second user account; and in response to associating the document with the second user account, causing display of an identifier associated with the virtual meeting in a second user interface associated with the second user account.

17. The system of claim 13, the operations further comprising:

receiving an interaction associated with a first user in the virtual space; and presenting, based at least in part on the interaction, an affordance, wherein a selection of the affordance is associated with receiving the request to create the virtual meeting.

18. The system of claim 13, the operations further comprising determining one or more permissions associated with the document, the one or more permissions including at least one of editing abilities of the document or a publicity of the document.

19. One or more non-transitory computer-readable media storing instructions that, when executed, cause one or more processors to perform operations comprising:

receiving a request to create a virtual meeting around a communication shared within a first message thread of a virtual space, wherein the communication is a root object of the first message thread;

determining, by a communication system, contextual data associated with the communication, the contextual data indicating at least a topic to be discussed during the virtual meeting, wherein determining the contextual data comprises analyzing the first message thread to identify thread-specific data associated with the root object;

identifying, by the communication system and based at least in part on the contextual data, one or more objects previously shared in the virtual space, wherein the one or more objects are associated with one or more users of the virtual space, wherein the one or more objects are specifically related to the root object as determined from the contextual data;

generating a document based at least in part on the request to create the virtual meeting, wherein the document is associated with a second message thread that is pre-populated with the root object and the one or more objects previously shared in the virtual space, wherein the document is a collaborative document that is accessible to members of the virtual space from within the virtual space, and wherein the second message thread is a distinct data structure from the first message thread;

automatically populating the document with data that is specifically related to the virtual meeting and that was previously included within the virtual space, wherein the data includes communications previously exchanged within the virtual space and objects related to the virtual meeting, wherein functionalities of the virtual space are imbued in the document such that the document facilitates interactions between participants of the virtual meeting during the virtual meeting, wherein the functionalities imbued in the document include at least messaging functionality, file sharing functionality, and presence-indication functionality that collectively enable the document to operate as a different virtual space;

receiving an indication to initiate the virtual meeting;

in response to receiving the indication to initiate the virtual meeting, causing display of the document in a user interface of the communication system, the document comprising the one or more objects previously shared in the virtual space and the data;

receiving, during the virtual meeting and within the second message thread, a plurality of communications, wherein a portion of the plurality of communications comprise one or more replies to the root object;

identifying metadata associated with the portion of the plurality of communications, wherein the metadata includes at least a sending user identifier, a message identifier, and a timestamp associated with the portion of the plurality of communications; and embedding, after the virtual meeting has been terminated, the metadata associated with the portion of the plurality of communications with the root object such that the one or more replies to the root object received during the virtual meeting persist within the first message thread, thereby updating the first message thread in the virtual space to reflect the plurality of communications that occurred within the second message thread of the document during the virtual meeting without requiring separate user action to transfer the plurality of communications.

20. The one or more non-transitory computer-readable media of claim 19, wherein the document is associated with a first user account of a first user, the operations further comprising:

receiving a second request to associate the document with a second user account of a second user that is different than the first user;

in response to receiving the second request, associating the document with the second user account; and in response to associating the document with the second user account, causing display of an identifier associated with the virtual meeting in a second user interface associated with the second user account.

* * * * *